(12) United States Patent
Yagi et al.

(10) Patent No.: US 9,449,237 B2
(45) Date of Patent: Sep. 20, 2016

(54) INFORMATION TERMINAL, INFORMATION CONTROL METHOD FOR AN INFORMATION TERMINAL, AND INFORMATION CONTROL PROGRAM

(75) Inventors: Daichi Yagi, Tokyo (JP); Hiroyuki Kawakami, Tokyo (JP); Akitaka Kimura, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 263 days.

(21) Appl. No.: 13/391,177

(22) PCT Filed: Sep. 30, 2009

(86) PCT No.: PCT/JP2009/005059
§ 371 (c)(1),
(2), (4) Date: Feb. 17, 2012

(87) PCT Pub. No.: WO2011/021259
PCT Pub. Date: Feb. 24, 2011

(65) Prior Publication Data
US 2012/0148120 A1 Jun. 14, 2012

(30) Foreign Application Priority Data
Aug. 21, 2009 (JP) .................................. 2009-192478

(51) Int. Cl.
*G06K 9/03* (2006.01)
*G06F 17/30* (2006.01)

(52) U.S. Cl.
CPC ......... *G06K 9/033* (2013.01); *G06F 17/30247* (2013.01)

(58) Field of Classification Search
None
See application file for complete search history.

(56) References Cited

U.S. PATENT DOCUMENTS

| 2009/0252383 | A1* | 10/2009 | Adam et al. ................... 382/118 |
| 2010/0014721 | A1* | 1/2010 | Steinberg ........... G06K 9/00288 382/118 |
| 2010/0226584 | A1* | 9/2010 | Weng ................. G06K 9/00221 382/225 |

FOREIGN PATENT DOCUMENTS

| JP | 2004-356984 | 12/2004 |
| JP | 2004356984 A * | 12/2004 |

(Continued)

OTHER PUBLICATIONS

Kim et al., "Fast and Efficient Face Image Browsing System on Consumer Electronics Devices", Ninth IEEE International Symposium on Multimedia 2007—Workshops, pp. 329-334, XP031239179 (2007).*

(Continued)

*Primary Examiner* — Kim Vu
*Assistant Examiner* — Fred Hu
(74) *Attorney, Agent, or Firm* — Oblon, McClelland, Maier & Neustadt, L.L.P

(57) ABSTRACT

To make it possible to significantly reduce a burden on a user at a time of a classification of image files added or updated, for example, and thus facilitate association with other content data. An image detector/register (20) detects an image file that is unregistered or updated, and structures and manages a list of the image files. A face rectangular detector (21) detects a face rectangle in the image files detected, associates information on the face rectangle with the image file, and stores the information. A similar face classification section (22) calculates an amount of feature of the face rectangle, compares the amount of feature calculated with amounts of feature of different face rectangles already calculated and classified into groups, calculates a similarity between the face rectangle and the face rectangles of the different face rectangles in the respective groups, and classifies and manages the face rectangles in accordance with a result of the similarity calculation. A similar face display section (23) displays at least one image file including the face rectangle classified into the same group on a display screen.

16 Claims, 15 Drawing Sheets

(56) References Cited

FOREIGN PATENT DOCUMENTS

JP        2005 157679        6/2005
JP        2009 027221        2/2009

OTHER PUBLICATIONS

Office Action issued Oct. 9, 2013 in Japanese Patent Application No. 2009-192478.
Chinese Office Action issued Mar. 27, 2013, in China Patent Application No. 200980160923.0 (with English translation).
Chen, et al., "Face Annotation for Family Photo Album Management", International Journal of Image and Graphics, vol. 3, No. 1, pp. 1-14, XP-002258648. (2003).
Duck et al., "Fast and Efficient Face Image Browsing System on Consumer Electronics Devices", Ninth IEEE International Symposium on Multimedia 2007—Workshops, pp. 329-334, XP031239179. (2007).
International Search Report issued on Jun. 8, 2010 in PCT/JP09/05059 filed on Sep. 30, 2009.

* cited by examiner

INFORMATION TERMINAL, INFORMATION CONTROL METHOD FOR AN INFORMATION TERMINAL, AND INFORMATION CONTROL PROGRAM

TECHNICAL FIELD

The present invention relates to an information terminal equipped with a display device capable of displaying images and the like such as a cellular phone terminal, and an information control method and an information control program for managing images that the information terminal handles and for displaying the images on a display screen.

BACKGROUND ART

For example, Japanese Patent Application Laid-open No. 2009-27221 (Patent Literature 1) discloses a technique of assigning phone numbers or e-mail addresses registered in a phone book or an address book to face images of persons who own the phone numbers or e-mail addresses and making it possible to easily identify a person as a communication target based on the face images to perform communication. In particular, in Patent Literature 1, from a picture image obtained by shooting a plurality of persons, face areas of the plurality of persons are extracted, and the face areas extracted can be associated with corresponding persons' phone numbers or e-mail addresses and collectively registered.

Further, for example, Japanese Patent Application Laid-open No. 2005-157679 (Patent Literature 2) discloses the following technique. A large number of information items on face images are previously learned and stored as dictionary data, picture images that are input are set as grayscale images, window images are cut off from scaling images obtained by scaling the grayscale images, the window images are compared with the information items stored as the dictionary data to determine parts close thereto. When this processing is repeatedly performed, a face image can be easily and quickly detected.

CITATION LIST

Patent Literature

[Patent Literature 1] Japanese Patent Application Laid-open No. 2009-27221 (FIG. 7)
[Patent Literature 2] Japanese Patent Application Laid-open No. 2005-157679 (FIG. 1)

SUMMARY OF INVENTION

Technical Problem

Incidentally, recent cellular phone terminals can execute various application programs including not only a telecom-related application program that handles a phone call or e-mail but also an application program for connection to the Internet and for browsing a website, an application program for taking a picture image or a moving image and reproducing and viewing those images, an application program for managing and reproducing music, and an application program for managing a schedule.

Further, the recent cellular phone terminals are often equipped with a function of associating content data originally handled by the above-mentioned various application programs with specific target content files such as a picture image file. Specifically, as a most typical example, it is possible to associate data of phone numbers, addresses, and the like of persons registered in a phone book or an address book with face image files of the corresponding persons as the communication targets.

Here, by continuing to use the cellular phone terminal, the number of new image files including an image file newly taken, a new image file attached to an e-mail or the like, and a new image file obtained from a web page or the like continues to increase. In addition, an image file temporarily stored is often changed or deleted, for example.

In the case where the image file is updated, that is, for example, the image file is newly added, changed, or deleted, for associating the updated image file with content data of the various applications, each time the image files are updated, a user has to check the image files one by one (for example, check what is in the image) and classify the image files.

The classifying operation is very troublesome and is a heavy burden for the user, which may end up leaving the image files unclassified in many cases, even when the update or the like of the image files are performed. Further, there is a fear in that the image files that are left as they are without being classified or associated may not be effectively utilized. That is, the image files are not even associated with the content data of another application for a telephone book or the like, for example.

The present invention has been proposed in view of the above-mentioned circumstances, and has an object to provide an information terminal, and an information control method and an information control program for the information terminal that can significantly reduce the burden on the user for classifying the updated image files and facilitate association of the image files with other content data.

Solution to Problem

An information terminal according to the present invention includes an image detector/register, a face image detector, a similar face classification section, and a similar face display section. The image detector/register detects an image file unregistered or updated, and structures and manages a list of the image files detected. The face image detector detects a face image included in an image of the image file detected by the image detector/register, associates information on the face image detected with the image file, and stores the information associated. The similar face classification section calculates an amount of feature of the face image detected by the face image detector, compares the amount of feature calculated with amounts of feature of different face images which are already calculated and classified into groups, calculates a similarity between the face image and the different face images in the respective groups, and classifies and manages the face image based on a result of the similarity calculation. The similar face display section displays at least one image file including the face image classified as the same group on a display screen based on a result of the classification of the face images by the similar face classification section. With this structure, the present invention overcomes the above-mentioned problem.

Further, an information control method for an information terminal according to the present invention includes the steps of detecting an image file unregistered or updated, and structuring and managing a list of the image files detected by an image detector/register, detecting a face image included in an image of the image file detected by the image detector/register, associating information on the face image detected with the image file, and storing the information by a face image detector, calculating an amount of feature of the face image detected by the face image detector, comparing the amount of feature calculated with amounts of feature of different face images which are already calculated and classified into groups, calculating a similarity between the face image and the different face images in the respective groups, and classifying and managing the face image based on a result of the similarity calculation by a similar face classification section, and displaying, by a similar face display section, at least one image file including the face image classified as the same group on a display screen based on a result of the classification of the face images which is performed by the similar face classification section. As a result, the above-mentioned problem is overcome.

Further, an information control program causes an information terminal to execute an image detection/registration processing for detecting an image file unregistered or updated and structuring and managing a list of the image files detected, a face image detection processing for detecting a face image included in an image of the image file detected by the image detector/register, associating information on the face image detected with the image file, and storing the information associated, a similar face classification processing for calculating an amount of feature of the face image detected by the face image detector, comparing the amount of feature calculated with amounts of feature of different face images which are already calculated and classified into groups, calculating a similarity between the face image and the different face images in the respective groups, and classifying and managing the face image based on a result of the similarity calculation, and a similar face display processing for displaying at least one image file including the face image classified as the same group on a display screen based on a result of the classification of the face image by the similar face classification section. As a result, the present invention overcomes the above-mentioned problem.

That is, according to the present invention, when the image file that is unregistered or updated is detected, that is, when the image file that has been subjected to update such as new addition and change is detected, a face image is detected from the image file and is compared with other face images already calculated and classified into groups, thereby classifying the detected face image. Thus, according to the present invention, the image file is classified each time the image file is updated, and the image file and other image files are grouped. Further, according to the present invention, one or more image files including the face image as the same group are displayed on the display screen based on the classification result. Accordingly, the user can check a classification condition of the image file, and can correct the classification result as necessary. As a result, the classified image file can be easily associated with content data of another desired application.

Advantageous Effects of Invention

In the present invention, a face image is detected from an unregistered or updated image file, and the face image is compared with other face images already calculated and classified into groups, thereby classifying the face image. Based on the classification result, one or more image files including the face image classified into the same group are displayed on the display screen. Thus, it is possible to significantly reduce the burden on the user for classifying the unregistered or updated image file, and make it easy to associate the image file with other content data.

DESCRIPTION OF EMBODIMENTS

Hereinafter, an embodiment of the present invention will be described with reference to the drawings.

It should be noted that this embodiment exemplifies a mobile body terminal such as a cellular phone terminal as an example to which an information terminal, an information control method, and an information control program of the present invention are applied, but contents described hereinbelow are merely an example and the present invention is of course not limited to this example.

(Schematic Exterior Structure of Mobile Body Terminal)

Figure 1:
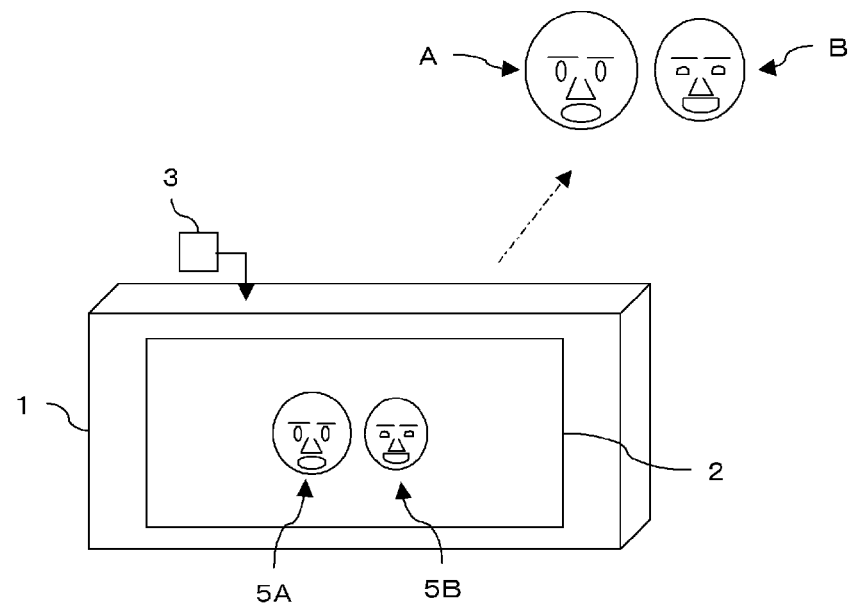
FIG. 1 A perspective view showing a schematic exterior of a mobile body terminal of an embodiment of the present invention, in which the mobile body terminal is viewed from a display screen side.
Figure 2:
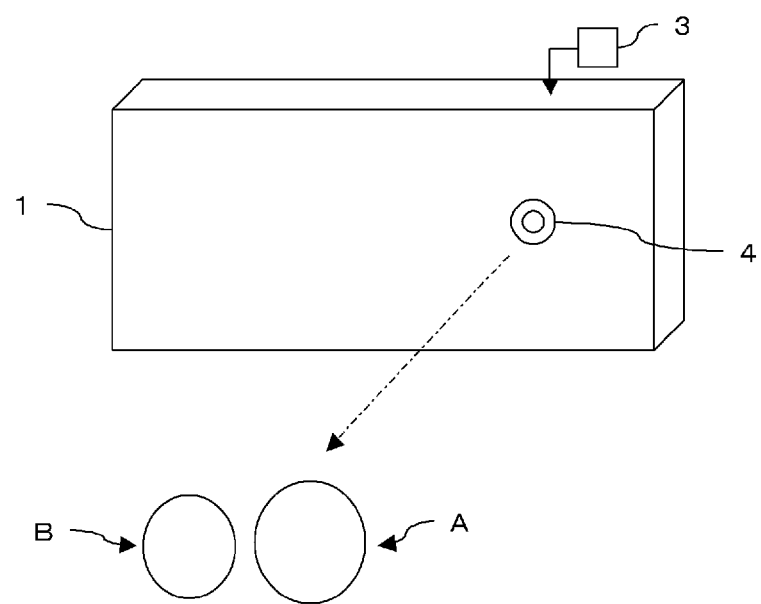
FIG. 2 A perspective view showing a schematic exterior of the mobile body terminal of the embodiment of the present invention, in which the mobile body terminal is viewed from a camera lens side.

FIGS. 1 and 2 are perspective views each showing a schematic exterior of a mobile body terminal according to this embodiment of the present invention. It should be noted that FIG. 1 is a diagram viewed from a side of a display screen 2 of the mobile body terminal of this embodiment, and FIG. 2 is a diagram viewed from a side of a camera lens 4 of the mobile body terminal of this embodiment. Further, FIGS. 1 and 2 show only main parts according to the present invention and do not show, for example, components provided to a general cellular phone terminal and the like.

A mobile body terminal 1 of this embodiment is a cellular phone terminal including, in a casing, the display screen 2, the camera lens 4, and a memory card slot (not shown) to/from which an external memory 3 can be inserted/detached.

Here, in the mobile body terminal 1 of this embodiment, in a case where persons of a subject A and a subject B (FIG. 1 shows only faces) are shot, a shooting direction (direction of dash-dotted-line arrow in the figure) of the camera lens 4 is coincided with a direction toward the subjects A and B. When the subjects A and B are being shot, images (subject images 5A and 5B) of the subjects A and B that are being shot are displayed on the display screen 2.

(Schematic Inner Structure of Mobile Body Terminal)

Figure 3:
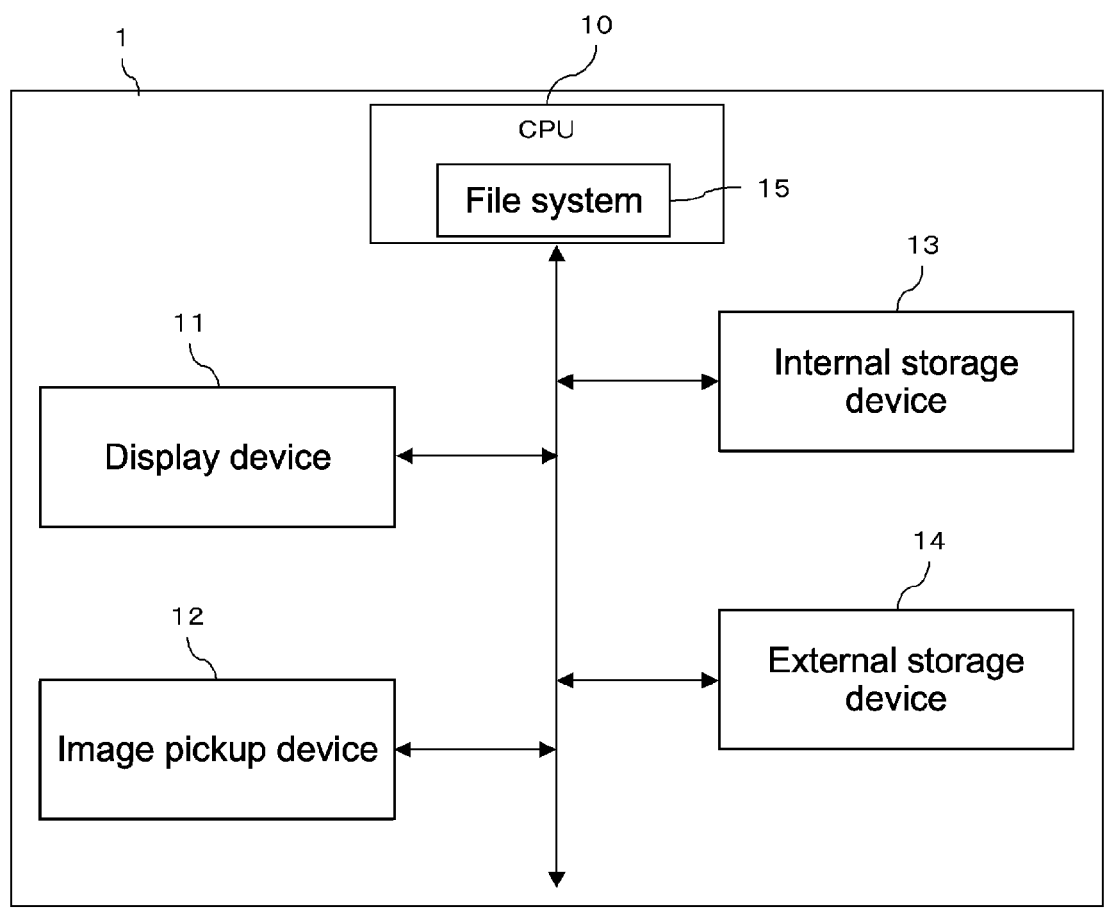
FIG. 3 A block diagram showing a schematic inner structure of the mobile body terminal of this embodiment.

FIG. 3 shows a schematic inner structure of the mobile body terminal 1 of this embodiment. It should be noted that FIG. 3 shows only main parts according to this embodiment and does not show components provided to a general cellular phone terminal or the like.

The mobile body terminal 1 of this embodiment includes, as inner main hardware components, a CPU (central processing unit) 10, a display device 11, an image pickup device 12, an internal storage device 13, and an external storage device 14.

The display device 11 includes a display screen constituted of a liquid crystal, an organic EL (Electroluminescence), or the like and a display drive circuit for the display screen, and displays various images, characters, and the like on the display screen based on an image signal supplied from the CPU 10.

The image pickup device 12 includes an optical lens (camera lens 4), an image pickup element, a lens drive mechanism that drives the optical lens for focusing or zoom factor changing, a drive circuit thereof, an image processing circuit that performs an image processing on an image pickup signal from the image pickup element, and the like. The image signal of a still image or a moving image taken by the image pickup device 12 is stored in the internal storage device 13 or the external storage device 14 under the control of the CPU 10.

The internal storage device 13 is a built-in memory provided in the mobile body terminal of this embodiment, and is constituted of a ROM (Read Only Memory) and a RAM (Random Access Memory). The ROM includes a rewritable ROM such as a NAND-type flash memory or an EEPROM (Electrically Erasable Programmable Read-Only Memory). The ROM stores a file system 15 structured on the CPU 10, a control program used for controlling the components by the CPU 10, various initial set values, dictionary data, audio data such as various operation sounds, and various application programs. It should be noted that examples of the various application programs include application programs for an SNS (Social Networking Service), an SMS (Short Message Service)/MMS (Multimedia Messaging Service), an e-mail, music, an moving image, a picture, schedule management, image taking, or the like. Further, the ROM also stores content data handled by the various application programs. Examples of the content data handled by the various application programs can include data such as a phone number, an e-mail address, a personal name, and an SNS account (hereinafter, collectively referred to as data of a phone book), data of a schedule book or a calendar, the SMS or MMS, message data of an e-mail, a communication history such as transmission/reception of the message data or incoming/outgoing calls, data of a still image or a moving image taken by the image pickup device 12 or transferred from a personal computer or the like, a still image or a moving image purchased via the Internet, a purchase history of music, and data file downloaded by a user via an network or the like. In addition, in this embodiment, the ROM also stores, as an information control program of the present invention, a content file management application program that detects specific target content files (described later) such as a taken image file that has been subjected to new addition, change, or the like, classifies the target content files in accordance with similarity to another content file, and manages the classified target content files. For example, those various application programs or the content file management application program of this embodiment may be transferred to the mobile body terminal of this embodiment through communication or via an external memory after shipment and installed, in addition to a case of being stored in the ROM at a time of shipment. The RAM stores various data including the content data when necessary as a work area used for performing processings on various data by the CPU 10.

The external storage device 14 includes the external memory 3, the memory card slot to/from which the external memory 3 can be inserted/detached, and an interface circuit for writing/reading with respect to the external memory 3 by the CPU 10 through the memory cart slot. It should be noted that the external memory 3 may include an attachable/detachable card-like external memory that holds SIM (Subscriber Identity Module) information or the like. In this case, the memory card slot is separately provided for each of the general external memory card and the SIM card.

The CPU 10 controls the components of the mobile body terminal 1 of this embodiment, and forms the so-called file system 15 to manage the various files. Further, the CPU 10 executes the various application programs stored in the internal storage device 13 and performs information processings on the various contents associated with the various application programs. In particular, in this embodiment, the CPU 10 executes the content file management application program of this embodiment, thereby classifying the specific target content files such as the taken image files updated, namely, the taken image files that have been subjected to new addition, change, or the like in accordance with the degree of similarity to the other content file, managing the classified content files, and as necessary, associating the classified target content files with content data handled by a desired application program to manage them.

(Functional Block when Content File Management Application Program is Executed)

Figure 4:
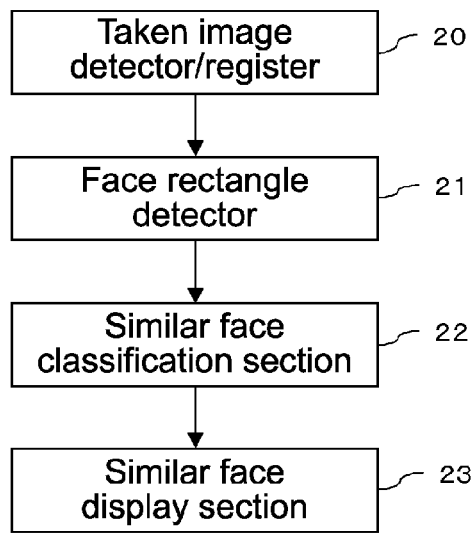
FIG. 4 A functional block diagram showing functions structured by a CPU when a content management application program is being executed.

FIG. 4 is a block diagram showing functions structured by the CPU 10 when the content file management application program is executed. It should be noted that in this embodiment, a picture image file is used as an example of the target content file, and the degree of similarity of a face image of a person in the picture image file is used as the degree of similarity of the target content file. An example of classifying and managing the picture image files in accordance with the degree of similarity is described.

As shown in FIG. 4, when the content file management application program is being executed, functional sections such as a taken image detector/register 20, a face rectangle detector 21, a similar face classification section 22, and a similar face display section 23 are formed in the CPU 10.

The taken image detector/register 20 detects the new addition, change, deletion, or the like of the taken image file, and forms and manages an information list of the image files stored in the mobile body terminal of this embodiment. It should be noted that in this embodiment, examples of the taken image file include a picture image file taken by the image pickup device 12 shown in FIG. 3, a picture image file stored in the internal storage device 13 or the external storage device 14, and a picture image file transferred via a network, an external connection cable, or the like. The CPU 10 detects and manages the new addition, change, or deletion of those picture image files with the use of the file system 15.

Based on the image file from which the new addition, change, deletion, or the like is detected by the taken image detector/register 20, the face rectangle detector 21 consults dictionary data for face detection that is learned in advance and prepared, detects a face rectangle image (window image of the face image) including a face area of a person who shows up in the image file, associates the detected face rectangle information with the image file, and stores the associated information.

The similar face classification section 22 calculates an amount of feature of the face rectangle image based on the face rectangle detected in the face rectangle detector 21, and compares the calculated amount of feature with an amount of feature of other face rectangles that are already calculated and classified into groups, thereby determining face rectangles of which group the face rectangle is similar to. Based on the similarity determination result, the face rectangle is classified. In addition, in this embodiment, it is also possible for the user of the mobile body terminal to manually classify the face rectangle detected in the face rectangle detector 21. It should be noted that as the amount of feature of the image of the face rectangle, a difference in luminance values among pixels that constitute the image of the face rectangle can be used.

Based on the classification result of the face rectangle by the similar face classification section 22, the similar face display section 23 causes, for example, one or more images including the face rectangle determined to be in the same group to be displayed on the display screen 2 of the display device 11.

(Details of Taken Image Detector/Register)

Figure 5:
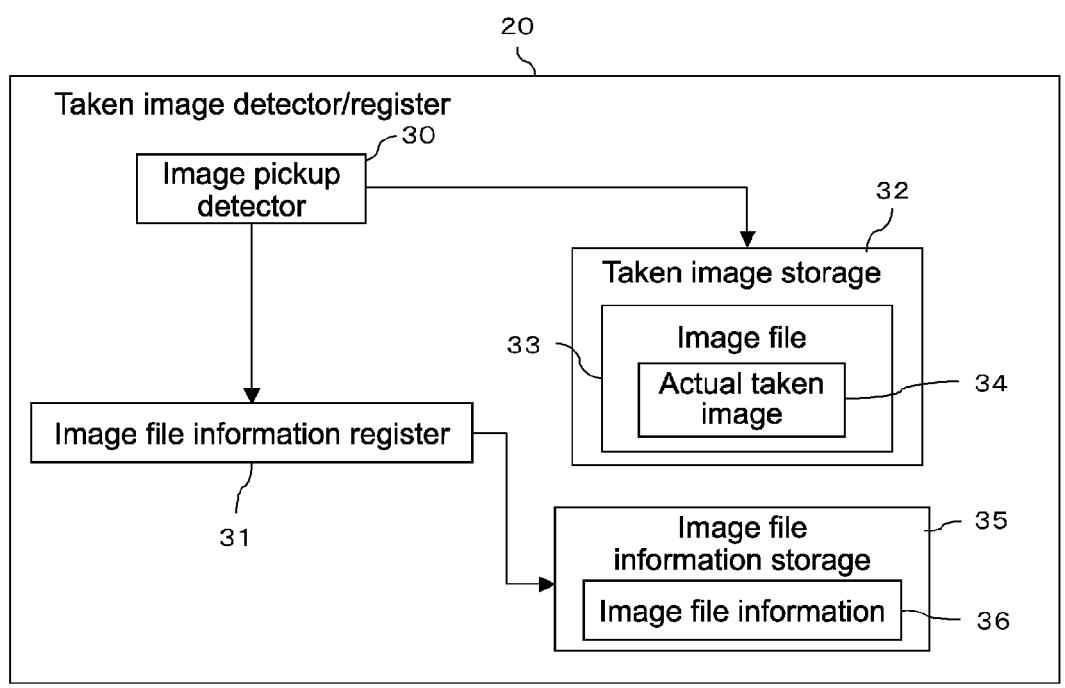
FIG. 5 A functional block diagram in a taken image detector/register in a case of executing a camera application program for image shooting and detecting that an image is taken by an image pickup device.
Figure 6:
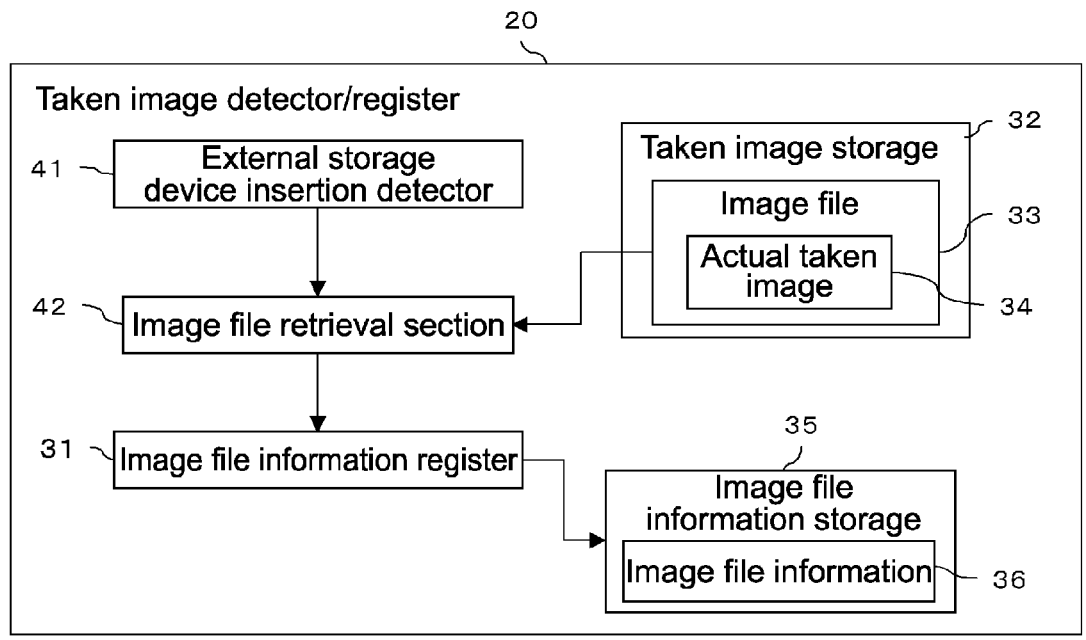
FIG. 6 A functional block diagram in the taken image detector/register in a case where an external memory is inserted in an external storage device.
Figure 7:
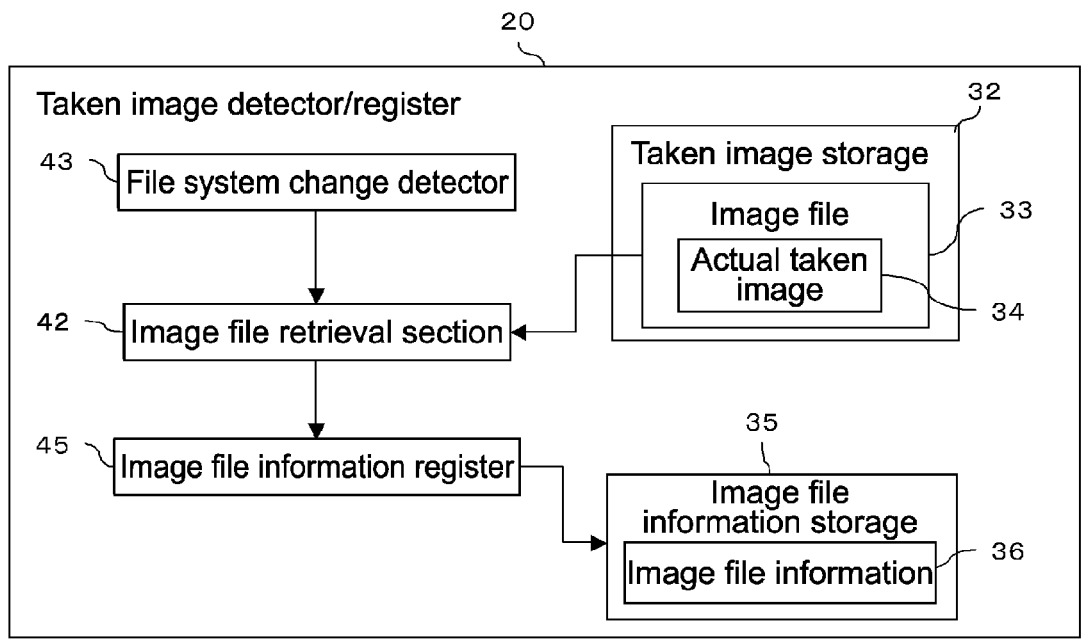
FIG. 7 A functional block diagram in the taken image detector/register in a case where an image file is newly added, changed, or deleted, for example.

FIGS. 5 to 7 are detailed functional block diagrams of the taken image detector/register 20.

FIG. 5 shows a functional block diagram in the taken image detector/register 20 in a case where the taken image detector/register 20 detects that the camera application program for image shooting is executed and an image is taken by the image pickup device 12. That is, when the camera application program is executed in a state where the content file management application program is being executed, an image pickup detector 30, an image file information register 31, a taken image storage 32, and an image file information storage 35 are formed.

In FIG. 5, when the image pickup detector 30 detects that the image pickup device 12 has taken the image, the image pickup detector 30 sends the picture image file supplied from the image pickup device 12 to the taken image storage 32. At this time, the taken image storage 32 stores, in the internal storage device 13 or the external storage device 14, a picture image file 33 that is the picture image file sent. It should be noted that the image file 33 includes actual taken image data 34 such as a subject image.

Further, at this time, the image pickup detector 30 also sends the picture image file to the image file information register 31. The image file information register 31 sends, to the image file information storage 35, image attribute information excluding the actual taken image data of the picture image file as image file information 36. The image file information storage 35 stores the image file information 36 in the internal storage device 13 or the like, and structures a database in which the image file information 36 and the image files 33 stored in the taken image storage 32 are associated with each other. It should be noted that the image attribute information includes various information items such as an image resolution, a data size, image taking date and time, a file name, an ID (identification information) of an image file, a white balance set value, an auto-focus set value, a shooting distance, backlight correction information, level correction information, bracket shooting information, thumbnail image information generated from the actual taken image data, and an F value of a camera lens of the image pickup device 12.

FIG. 6 shows a functional block diagram in the taken image detector/register 20 in a case where the external memory 3 is inserted to the external storage device 14. That is, when the content file management application program is being executed, in the taken image detector/register 20, an external storage device insertion detector 41, an image file retrieval section 42, the image file information register 31, the taken image storage 32, and the image file information storage 35 are formed.

In FIG. 6, when the external memory 3 is inserted to the memory card slot of the external storage device 14, the external storage device insertion detector 41 detects that the external memory 3 is inserted to the memory card slot. When the external storage device insertion detector 41 detects the insertion of the external memory 3, the taken image detector/register 20 causes the image file retrieval section 42 to function.

The image file retrieval section 42 in this case checks whether the picture image files are stored in the external memory 3. When the picture image files are stored, the image file retrieval section 42 retrieves, from the image files, an unregistered image file whose image file information 36 is not registered in the image file information storage section 35. When finding out the unregistered image file, the image file retrieval section 42 sends the image file to the image file information register 31. Accordingly, the image file information storage 31 sends the image file information 36 of the image file to the image file information storage 35. In the image file information storage 35, the image file information 36 is associated with the picture image file stored in the external memory 3 and registered in the database.

FIG. 7 shows a functional block diagram in the taken image detector/register 20 in a case where the image file is transferred and newly added via the network, the external connection cable, or the like or the image file already stored in the internal storage device 13 or the external storage device 14 is changed or deleted. That is, when the content file management application program is being executed, a file system change detector 43, the image file retrieval section 42, the image file information register 31, the taken image storage 32, and the image file information storage 35 are formed in the taken image detector/register 20.

In FIG. 7, the file system change detector 43 always monitors file updates including new addition of the image file to the internal storage device 13 or the external storage device 14 and change, deletion, or the like of the already stored image file while checking the operation of the file system 15. When the file system change detector 43 detects the file updates including the new addition, change, deletion, or the like of the image file by the file system 15, the taken image detector/register 20 causes the image file retrieval section 42 to function.

Here, when the image file is newly added, the image file retrieval section 42 sends the image file (33) to the taken image storage 32 to be stored therein, and sends the image attribute information (image file information 36) to the image file information storage 35 through the image file information register 31 to be stored therein. In addition, in a case where the image file is changed, the image file retrieval section 42 retrieves the image file 33, the change of which is detected by the file system change detector 43, from the image files 33 managed by the taken image storage 32 and causes the image file information storage 35 to store the image attribute information of the image file changed through the image file information register 31. In a case where the image file is deleted, the image file retrieval section 42 causes the image file information storage 35 to delete the image attribute information corresponding to the deleted image file through the image file information register 31. In addition, the image file information register 31 updates the database in accordance with the new addition, change, deletion, or the like.

(Details of Face Rectangle Detector)

Figure 8:
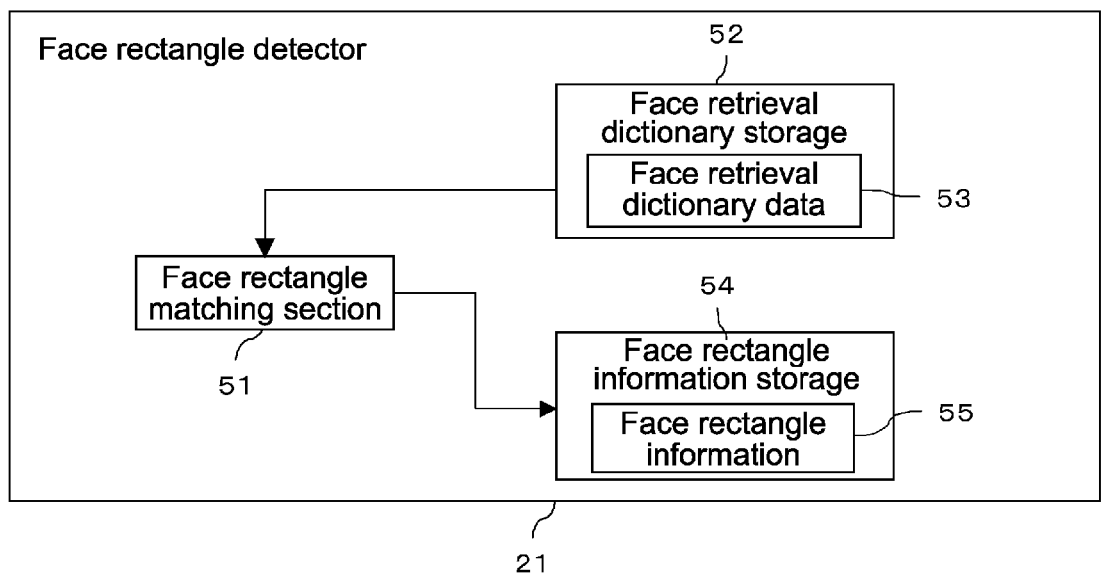
FIG. 8 A detailed functional block diagram of a face rectangle detector.

FIG. 8 is a functional block diagram showing details of the face rectangle detector 21.

In FIG. 8, the face rectangle detector 21 includes a face rectangle matching section 51, a face retrieval dictionary storage 52, and a face rectangle information storage 54.

In the face retrieval dictionary storage 52, information on faces learnt by using a large number of face images is registered in advance as the face retrieval dictionary data 53.

The face rectangle matching section 51 scales the images of the input image files, and compares the scaling images thus obtained with the information registered in advance in the face retrieval dictionary data 53. By repeatedly performing judgment (matching) of similar portions between the scaling images and the information, the face rectangular matching section 51 finds out from the picture image a face area, positions of both eyes, a nose, and a mouth, and the like, and detects those information items as the face rectangle information 55.

The face rectangle information storage 54 gives an ID (identification information) to face rectangle information 55 detected by the face rectangle matching section 51, and structures a database by associating the ID with the image file, to store the ID and the image file associated in the internal storage device 13, for example.

(Details of Similar Face Classification Section)

Figure 9:
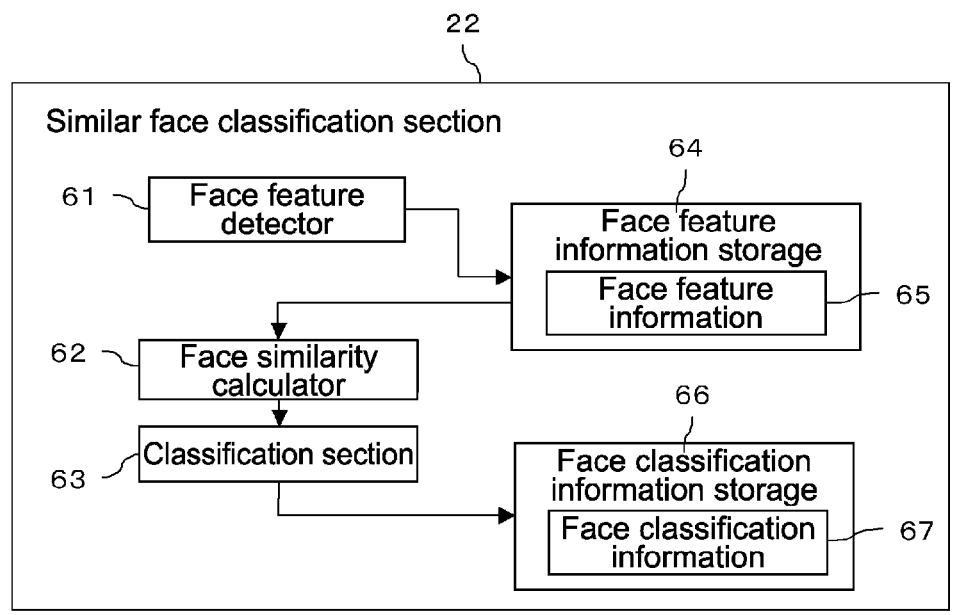
FIG. 9 A functional block diagram in a similar face classification section in a case where face rectangles detected by the face rectangle detector is classified into groups.
Figure 10:
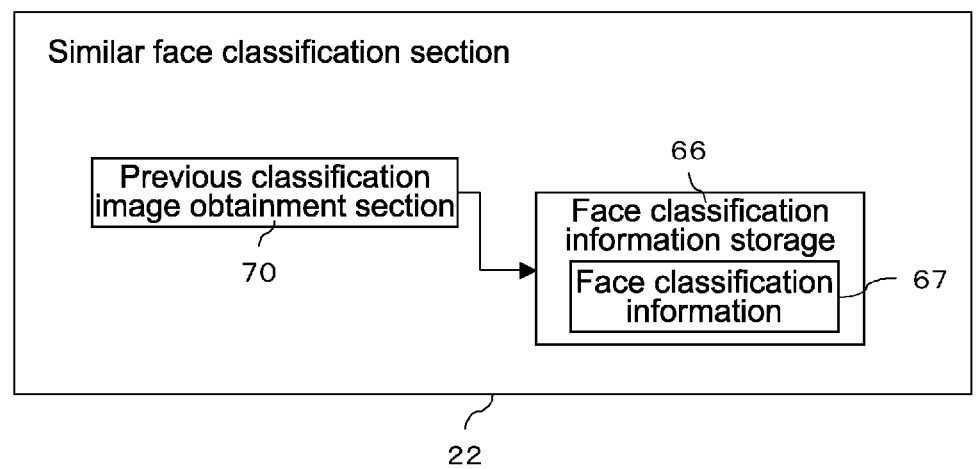
FIG. 10 A functional block diagram in the similar face classification section in a case where classification information is previously given to an image file by another method and the face rectangles are classified with reference to the classification information.
Figure 11:
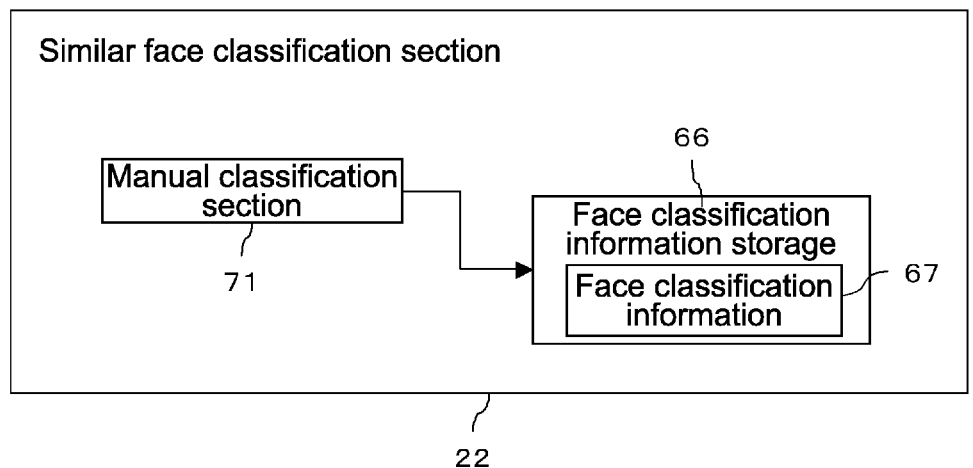
FIG. 11 A functional block diagram in the similar face classification section in a case where a user of the mobile body terminal manually classifies the image files.

FIGS. 9 to 11 each show a functional block diagram of the similar face classification section 22.

FIG. 9 shows a functional block diagram in the similar face classification section 22 in a case where the face rectangles detected by the face rectangle detector 21 shown in FIG. 8 are classified into groups.

In the case of FIG. 9, the similar face classification section 22 is constituted of a face feature detector 61, a face similarity calculator 62, a classification section 63, a face feature information storage 64, and a face classification information storage 66.

The face feature detector 61 calculates an amount of feature of the face rectangle detected by the face rectangle detector 21. The amount of feature is expressed by a difference of luminance values among pixels that constitute the image of the face rectangle, for example.

The face feature information storage 64 stores and manages face feature information 65 that is already calculated.

The face similarity calculator 62 compares the amount of feature that is calculated by the face feature detector 61 with the face feature information 65 stored in the face feature information storage 64, thereby calculating the similarity for each face rectangle.

The classification section 63 creates an aggregate (group) of face rectangles having close similarities, that is, an aggregate (group) of similar face rectangles based on the similarities calculated by the face similarity calculator 62, and classifies the face rectangles for each aggregate (group).

The face classification information storage 66 stores and manages face classification information items 67 classified for each group by the classification section 63.

FIG. 10 is a functional block diagram in the similar face classification section 22 in a case where the classification information is given to the image file in advance by another method and the face rectangles are classified based on the classification information.

In the case of FIG. 10, the similar face classification section 22 is constituted of a previous classification image obtainment section 70 and the face classification information storage 66.

The previous classification image obtainment section 70 classifies the image files based on the classification information that is previously given by another method.

The face classification information storage 66 receives the image files from the previous classification image obtainment section 70, and stores and manages the face classification information 67 of the image file.

FIG. 11 is a functional block diagram in the similar face classification section 22 in a case where the images are classified manually by a user of the mobile body terminal.

In the case of FIG. 11, the similar face classification section 22 is constituted of a manual classification section 71 and the face classification information storage 66.

The manual classification section 71 classifies the image files in accordance with an instruction of the user.

The face classification information storage 66 receives the image files from the manual classification section 71, and stores and manages the face classification information 67 of the image file.

It should be noted that the manual classification in the case of FIG. 11 includes a case of manually correcting classification results obtained in the cases of FIGS. 9 and 10.

(Process Flow in Similar Face Classification Section)

Figure 12:
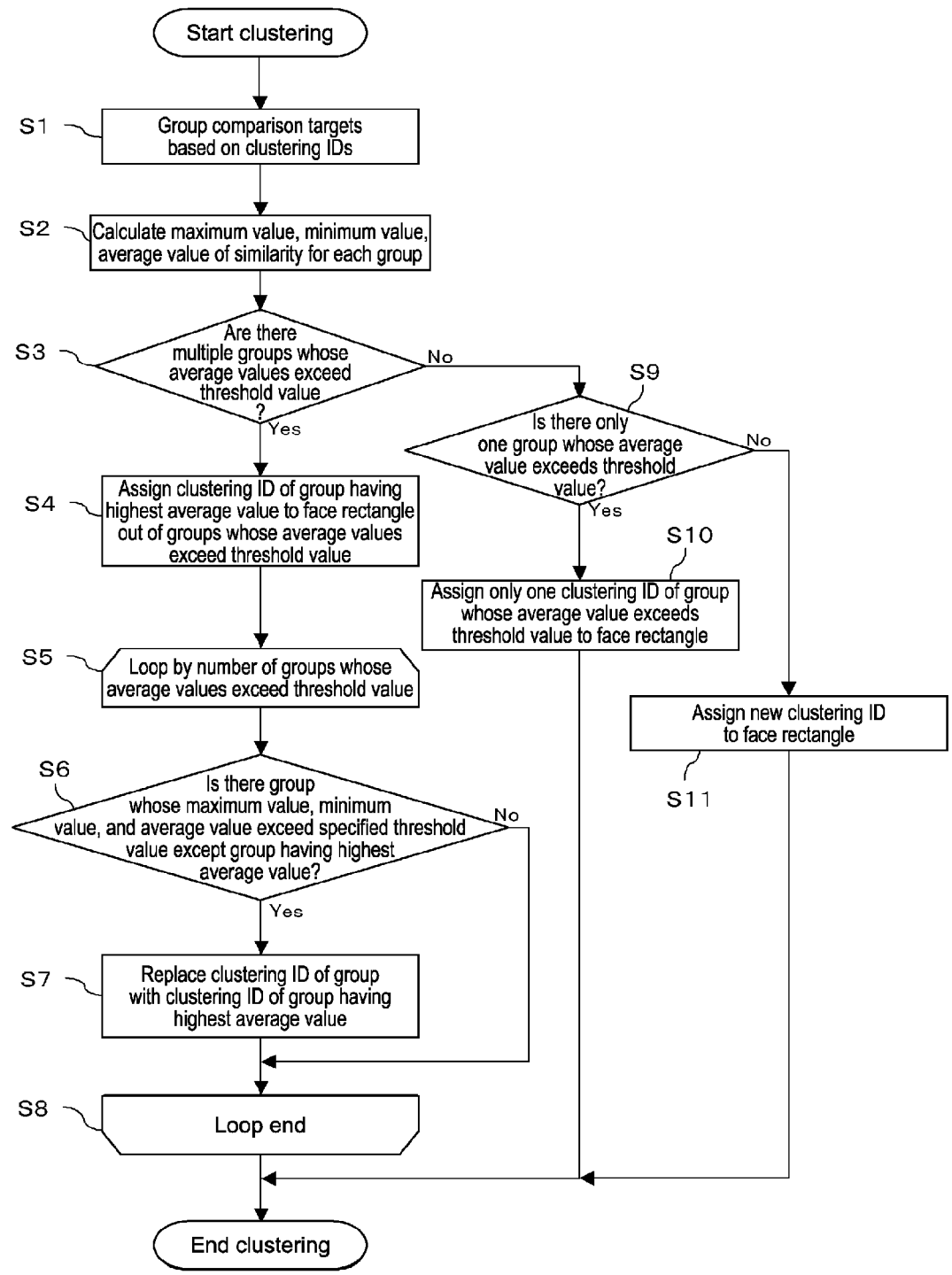
FIG. 12 A flowchart in a process in a face similarity calculator and a classification section of the similar face classification section.

FIG. 12 is a flowchart showing a process in the face similarity calculator 62 and the classification section 63 of the similar face classification section 22 shown in FIG. 9 described above.

In FIG. 12, first, the face similarity calculator 62 prepares the number of face rectangles detected by the face feature detector 61, priorities (Similarity scores) as many, and identifiers (Clustering IDs) of the groups as many. It should be noted that the clustering IDs in this case are temporal IDs that are different from the clustering IDs of the groups already classified.

Next, in Step S1, the face similarity calculator 62 gives the prepared clustering IDs to the face rectangles detected by the face feature detector 61, thereby grouping the face rectangles.

Subsequently, in Step S2, the face similarity calculator 62 calculates a similarity by comparing the amount of feature of each face rectangle of each group already classified with the amount of feature of the face rectangle detected by the face feature detector 61, and calculates a maximum value, a minimum value, and an average value of the similarity for each group. Then, the face similarity calculator 62 passes the processing to the classification section 63.

In Step S3, the classification section 63 judges whether there are a plurality of groups whose average values of the similarity exceed a first threshold value. When it is judged that there are the plurality of groups whose average values of the similarity exceed the first threshold value, the process proceeds to Step S4, and otherwise, the process proceeds to Step S9.

In a case where the process proceeds to Step S9, the classification section 63 judges whether there is only one group whose average value of the similarity exceeds the first threshold value. When it is judged that there is only one group whose average value of the similarity exceeds the first threshold value, the process proceeds to Step S10, and when there is no group whose average value of the similarity exceeds the first threshold value, the process proceeds to Step S11.

In Step S11, the classification section 63 assigns a new clustering ID to the face rectangle. That is, in this case, the face rectangle detected by the face feature detector 61 is a new face rectangle that does not belong to any groups already classified. Therefore, the new clustering ID (i.e., new group) is assigned to the new face rectangle. After Step S11, the process of the flowchart shown in FIG. 12 is ended.

On the other hand, in Step S10, the classification section 63 assigns only one clustering ID of a group whose average value exceeds the first threshold value to the face rectangle. That is, in this case, the face rectangle detected by the face feature detector 61 is judged to be the face rectangle that belongs to a certain group already classified, and the clustering ID of the group is assigned to the face rectangle. After Step S10, the process of the flowchart shown in FIG. 12 is ended.

When it is judged that there are the plurality of groups whose average values of the similarity exceed the first threshold value in Step S3 and the process proceeds to Step S4, the classification section 63 assigns, to the face rectangle, a clustering ID of a group having the highest average value among the plurality of groups whose average values exceed the first threshold value.

Next, the classification section 63 performs a loop process of Step S5 to Step S8. In the loop process, the process is repeated by the number of groups.

In the loop process of Step S5 to Step S8, the classification section 63 judges whether a group other than the group having the highest average value has a maximum value, a minimum value, and an average value of the similarity that exceed a predetermined second threshold value. When judging that the maximum value, the minimum value, and the average value of the group exceed the second threshold value, the classification section 63 subsequently performs a process of Step S7. On the other hand, when judging that the maximum value, the minimum value, and the average value of the certain group do not exceed the second threshold value, the classification section 63 performs the judgment on the next group.

In Step S7, the classification section 63 replaces the clustering ID of the group with the clustering ID of the group having the highest average value. That is, in this case, the classification section 63 performs of combining those groups.

When the loop process of Step S5 to Step S8 is repeatedly performed by the number of the groups, the process of the flowchart shown in FIG. 12 is ended.

It should be noted that as shown in FIG. 11, in the case where the user of the mobile body terminal manually classifies the image files (face rectangles), the average value (and the maximum value and minimum value in some cases) of the group to which the manually classified face rectangle belongs changes. Further, when the manual classification is performed, a face rectangle that is difficult to be accurately classified by the automatic classification can be positively classified, and the information of the manual classification is reflected for the automatic classification. As a result, it becomes possible to perform automatic classification with higher accuracy.

(Details of Similar Face Display Section)

Figure 13:
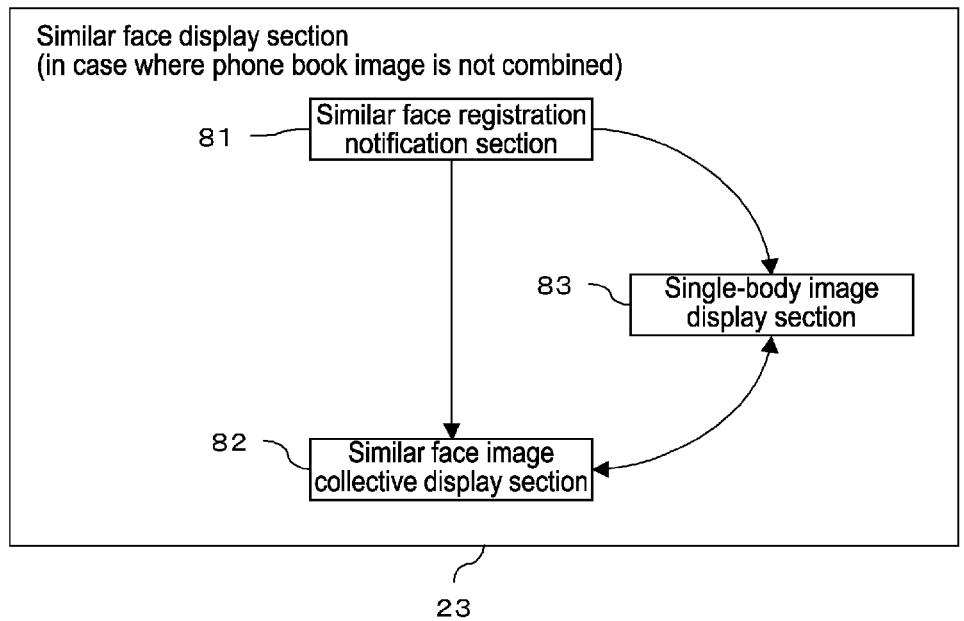
FIG. 13 A detailed functional block diagram of a similar face display section constituted of a similar face registration notification section, a single image display section, and a similar face image collective display section.
Figure 14:
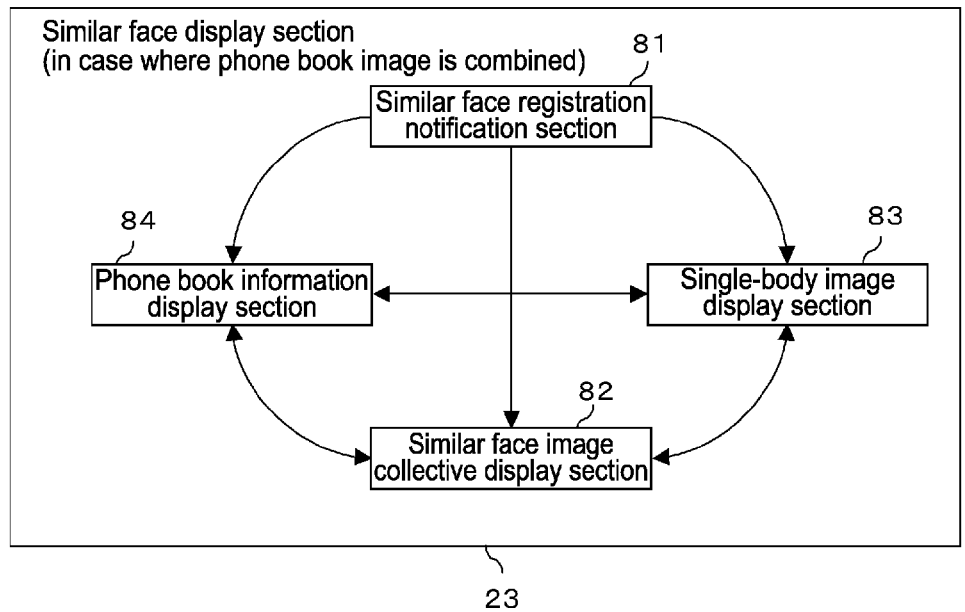
FIG. 14 A detailed functional block diagram of the similar face display section constituted of the similar face registration notification section, the single image display section, the similar face image collective display section, and a telephone information display section.

FIGS. 13 and 14 are detailed functional block diagrams of the similar face display section 23. FIGS. 15 to 18 are diagrams each showing a display example in a case where an image is displayed on the display screen 2 of the mobile body terminal 1.

As shown in FIG. 13, the similar face display section 23 is constituted of a similar face registration notification section 81, a single image display section 83, and a similar face image collective display section 82.

When the taken image detector/register 20 detects the image file, the face rectangle detector 21 detects the face rectangle, and thereafter the similar face classification section 22 classifies the face rectangle as described above, the similar face registration notification section 81 notifies the user of the completion of the classification and registration of the face image. In this embodiment, to notify the user of the completion of the classification and registration of the similar face image, used is a method of displaying a predetermined icon in the vicinity of the card-like object displayed on a standby screen of the cellular phone terminal or on a predetermined position of the object, for example. It should be noted that as another method, notification functions originally equipped to the mobile body terminal, such as a sound output, an LED emission, and a vibrator's vibration, may be used for notifying the user of the completion of the classification and registration of the similar face image.

Figure 15:
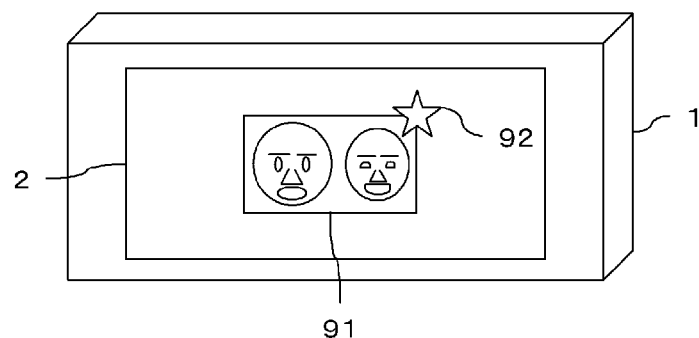
FIG. 15 A diagram showing an example in which an image file including a face rectangle is displayed on a display screen as a card-like object, and a predetermined notification icon is indicated in the vicinity of the card-like object, as an example of notification of completion of similar face classification and registration.

FIG. 15 shows an example of notifying the completion of the classification and registration of the similar face images. In this example of FIG. 15, on the display screen 2, an image file including the face rectangle is displayed as a card-like object 91 and a similar face registration notification icon 92 predetermined is displayed in the vicinity of the card-like object 91. Although only one card-like object 91 is displayed in the example of FIG. 15, a plurality of card-like objects in a chronological order corresponding to an update history can be arranged and displayed on the display in the mobile body terminal of this embodiment as described later. According to the mobile body terminal of this embodiment, in the case where the plurality of card-like objects are arranged and displayed, it is also possible to notify the user of the completion of the classification and registration of the face images in the image files corresponding to the card-like objects by displaying the icon for the similar face registration notification in the vicinity of the card-like objects corresponding to the image files in which the classification and registration of the face images are completed or the predetermined positions of the objects, as in the example of FIG. 15.

The single image display section 83 and the similar face image collective display section 82 function when a predetermined instruction operation is input by the user in the case where the similar face registration notification is performed as shown in FIG. 15 or in a case where the single image display section 83 or the similar face image collective display section 82 displays the image. It should be noted that the predetermined instruction operation input by the user is, for example, an operation (e.g., touch, tap, or flick) to a touch pad in a case where a so-called touch panel is provided on the display screen 2 of the mobile body terminal 1.

Figure 16:
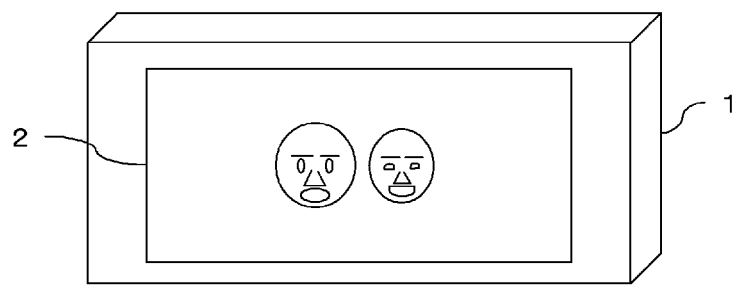
FIG. 16 A diagram showing an example in which a single image display is performed on the display screen by inputting a predetermined instruction operation for requesting the single image display by a user.

For example, at the time when the similar face registration notification is performed in the example of FIG. 15, if the predetermined instruction operation for requesting to display a single image is input by the user, the single image display section 83 displays an image of the image file corresponding to the card-like object 91 on the display screen 2 as shown in FIG. 16, for example. It should be noted that in the case where the plurality of card-like objects are arranged and displayed on the display screen 2 in the chronological order, when the user selects one from among the card-like objects and inputs the predetermined instruction operation for requesting to display the single image, the single image display section 83 also displays on the display screen 2 the image of the image file corresponding to the card-like object selected by the user.

Figure 18:
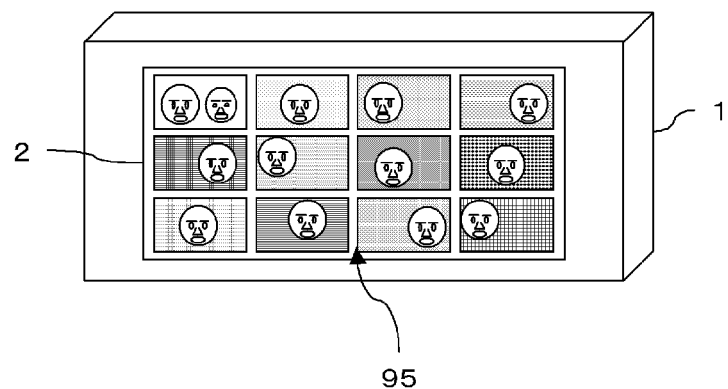
FIG. 18 A diagram showing an example in which thumbnails of a plurality of image files each having a similar face image are listed on the display screen.

Further, for example, at the time when the similar face registration notification is performed through the similar face registration notification icon 92 as shown in FIG. 15, if the operation, e.g., the touching operation to the similar face registration notification icon 92 is input by the user as the operation for requesting to perform the collective display of the similar face images, the similar face image collective display section 82 displays a list of thumbnail images 95 of the image files in the groups previously classified as the images similar to the face image of the image file corresponding to the card-like object 91, for example, as shown in FIG. 18. It should be noted that in the case where the plurality of card-like objects are arranged and displayed on the display screen 2 in the chronological order, when the user selects one from among the card-like objects that have been subjected to the similar face registration notification through the similar face registration notification icon and inputs the operation (e.g., touching operation to the similar face registration notification icon 92) for requesting the similar face image collective display, the similar face image collective display section 82 also displays the list of the thumbnail images of the image files in the groups previously classified as the similar images to the face image of the image file corresponding to the selected card-like object.

In addition, the similar face image collective display as shown in FIG. 18 is also performed in a case where the user inputs the operation (e.g., touching operation to the similar face registration notification icon 92) of requesting the collective display of the similar face images at the time when the single image display shown in FIG. 16 is performed, for example.

On the other hand, for example, in a case where the similar face image collective display is performed as shown in FIG. 18, when the user selects a desired thumbnail image from among the thumbnail images 95 displayed on the display screen 2 and inputs a predetermined instruction operation for requesting the single image display, the single image display section 83 displays the single image of the image file corresponding to the selected thumbnail image on the display screen 2. It should be noted that the single image display shown in FIG. 16 is performed when a thumbnail image disposed at an upper-left corner is selected in the example of FIG. 18.

Further, according to the mobile body terminal of this embodiment, in the case where the similar face registration notification, the single image display, or the similar face image collective display described above is performed on the display screen 2, when a phone book is associated with the displayed face images, it is also possible to link with the information of the phone book.

FIG. 14 is a functional block diagram of the similar face display section 23 in a case where the linkage with the phone book information is possible. In the example of FIG. 14, the similar face display section 23 is constituted of the similar face registration notification section 81, the single image display section 83, and the similar face image collective display section 82, and a phone book information display section 84. The similar face registration notification section 81, the single image display section 83, and the similar face image collective display section 82 are the same as above.

In the case where the similar face registration notification, the single image display, and the similar face image collective display are performed and an image associated with the phone book is selected by the user, the phone book information display section 84 functions.

Figure 17:
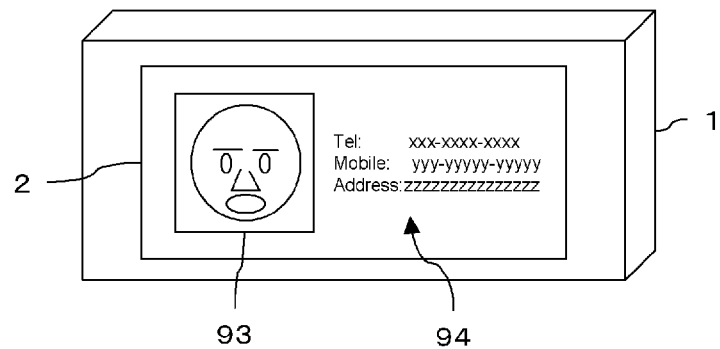
FIG. 17 A diagram showing a face image and information of a phone book that are displayed on the display screen by associating the face image with the phone book.

For example, in the case where the similar face registration notification shown in FIG. 15 is performed and the card-like object 91 is associated with the phone book, when the user inputs a predetermined instruction operation for requesting to display the phone book to the card-like object 91, the phone book information display section 84 displays phone book information 94 associated with a face image 93 corresponding to the card-like object 91 on the display screen 2 along with the face image 93 as shown in FIG. 17, for example.

Further, for example, in the case where the similar face image collective display shown in FIG. 18 is performed, when the user selects a desired thumbnail image from among the thumbnail images 95 displayed on the display screen 2 and inputs the predetermined instruction operation for requesting to display the phone book, the phone book information display section 84 displays the phone book information 94 associated with the face image corresponding to the selected thumbnail image on the display screen 2 along with the face image 93, as shown in FIG. 17.

Similarly, in the case where the single image display shown in FIG. 16 is performed, when the user inputs the predetermined instruction operation for requesting to display the phone book, the phone book information display section 84 displays, on the display screen 2 along with the face image 93, the phone book information 94 associated with the image file displayed as the single image, as shown in FIG. 17.

On the other hand, in the case where the phone book information is displayed as shown in FIG. 17, when the user inputs the predetermined instruction operation for requesting to display the single image display, the single image display section 83 displays on the display screen 2 the image of the image file corresponding to the card-like object 91 as shown in FIG. 16, for example.

Further, for example, in the case where the phone book information is displayed as shown in FIG. 17, when the user performs an operation of touching the similar face registration notification icon 92 for requesting the collective display of the similar face images, the similar face image collective display section 82 displays the list of the thumbnail images 95 of the image files in the groups previously classified as the similar images to the face image 93 displayed with the phone book information 94, as shown in FIG. 18.

(Examples of Arrangement Display of Plurality of Card-Like Objects)

Figure 19:
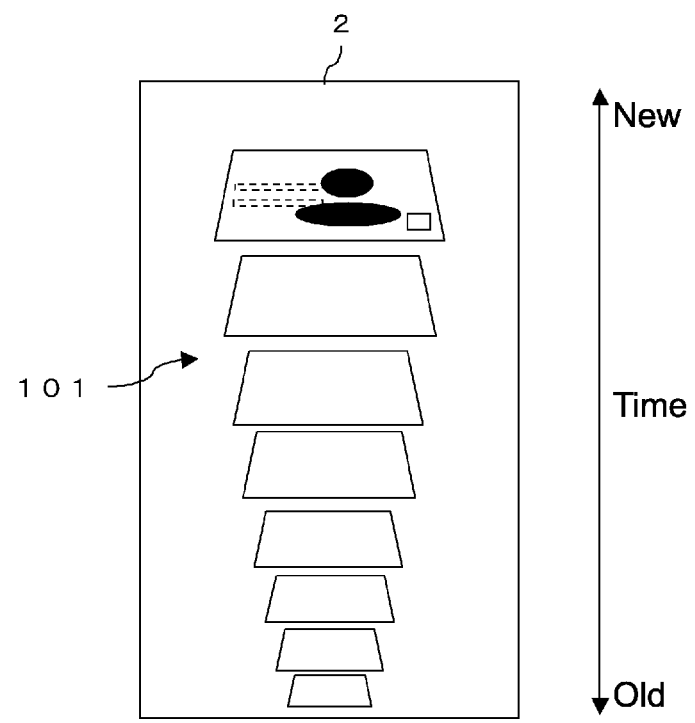
FIG. 19 A diagram showing an example of a user interface screen in a state where a plurality of card-like objects are arranged in a chronological order of update, change, or the like of content data and displayed.
Figure 20:
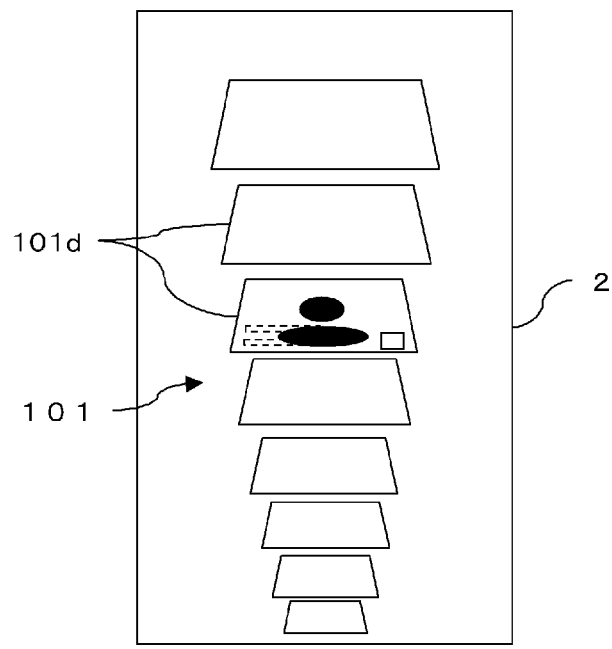
FIG. 20 A diagram for explaining, in particular, a case where all the card-like objects are in an idle state on the user interface screen in the state where the plurality of card-like objects are arranged in the chronological order of update, change, or the like of the content data and displayed.
Figure 21:
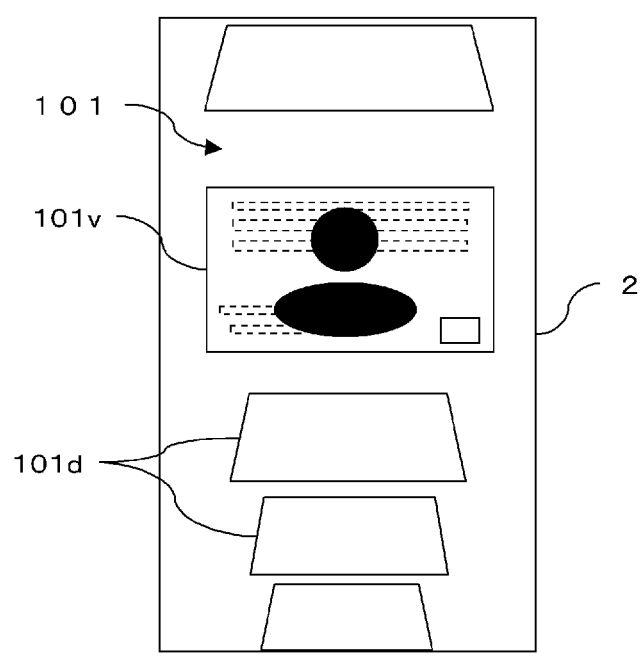
FIG. 21 A diagram showing a display example particularly in a case where any one of the card-like objects is in a preview state on the user interface screen in the state where the plurality of card-like objects are arranged in the chronological order of update, change, or the like of the content data and displayed.

In this embodiment, in addition to the card-like object relating to the content data corresponding to the image file as shown in FIG. 15, card-like objects for notifying the user of the update, addition, or the like of various contents handled by various application programs for the e-mail, SNS, SMS/MMS, music reproduction, or the like are prepared as the card-like object described above, for example. According to the mobile body terminal of this embodiment, it is possible to arrange and display the card-like objects corresponding to the various content data of the various application programs on the standby screen or the like of the cellular phone terminal, for example, as shown in FIGS. 19 to 21. It should be noted that FIGS. 19 to 21 each show a diagram in which the display screen 2 is longitudinally set.

Specifically, in this embodiment, card-like objects 101 arranged as shown in FIG. 19 are regarded as display objects for easily understandably indicating the update or addition of the corresponding content data and an outline of the update or addition to the user.

Further, in this embodiment, on the card-like object 101, displayed is information that properly indicates characteristics of the contents and details of the update, such as information indicating which program the content is corresponded to, out of the various application programs for the SNS, SMS, e-mail, music, picture, and the like, information that is unique to each content and capable of indicating the content attribute information, such as a message transmission source and a news headline, and information indicating a date and time when the content date is updated or added, for example.

In this embodiment, as the information indicating which application program the content is corresponded to, an icon, character information, or the like corresponding to the kinds of the contents is used. The icon or the character information is prepared in advance as information that differs depending on the contents. In addition, as the information that is unique to each content and capable of indicating the attribute information thereof, character information indicating a message transmission source, an image such as a picture, character information indicating a news delivery source and a news headline, or the like is used. Further, as the information indicating the date and time when the content data or the like is updated or added, character information indicating date, month, and year, date and time, or the like is used. It should be noted that the examples of FIGS. 19 and 20 do not show which content each card-like object 101 is corresponded to, and do not show a specific example of the character information and the like described on the card 101 for the update information indication.

In addition, in this embodiment, in the case where the plurality of card-like objects 101 are indicated on the display screen 2, the card-like objects 101 are arranged, for example, in a row in a chronological order of updating the content data and displayed, which can easily understandably indicate a temporal relationship among the content data in terms of the update, addition, and the like.

That is, FIGS. 19 and 20 each show an example of a user interface screen in a state where the plurality of card-like objects 101 are arranged and displayed in the chronological order in which the content data is updated or changed, for example. It should be noted that FIGS. 19 and 20 each show the display example of the card-like objects 101 at a time when the mobile body terminal of this embodiment as the cellular phone terminal is in a so-called standby state. Of course, this is merely an example, and the screen shown in FIGS. 19 and 20 may not be the stand-by screen but be a predetermined screen additionally prepared.

More specifically, in this embodiment, the plurality of card-like objects 101 displayed on the screen are displayed (reversely chronologically displayed) so as to be arranged in succession in a reverse chronological order of the update date and time from the top to the bottom of the screen when viewed from the user. That is, in the reverse chronological order of the update, addition, or the like (in the order from the top to the bottom of the screen), a card-like object indicating that the SMS is received, a card-like object indicating that another SMS is received, a card-like object indicating that a news from an RSS (RDF (Resource description framework) Site Summary) is updated, a card-like object indicating that the SNS is updated, and a card-like object indicating that the image file such as the picture of this embodiment is added or updated, for example, are arranged and displayed in succession.

It should be noted that FIG. 19 shows the example in which the objects are arranged in the reverse chronological order from the top to the bottom of the screen, but the objects may of course be arranged in a reverse order. In addition, FIG. 19 shows the example in which the display screen is used longitudinally. But, in a case where the display screen is used laterally as described above, the card-like objects may be arranged and displayed in the chronological order from the left to the right (or from the right to the left) of the screen, for example (that is, the card-like objects are arranged in a row sideways and displayed). Further, in a case where the display of the screen of the terminal of this embodiment can be used by switching the screen direction between the vertical direction and the lateral direction, the direction in which the card-like objects are arranged in a row may be switched to the vertical direction or the lateral direction in conjunction with the switching of the screen direction between the vertical direction and the lateral direction. As a result, in accordance with a use condition in which the screen is used longitudinally or laterally, a larger number of card-like objects can be displayed. In addition, the card-like objects may be overlapped in a diagonal direction and displayed.

Further, in addition to the case where the card-like objects are linearly arranged in a row, the card-like objects may be curvedly arranged and displayed. In the case where the card-like objects are curvedly arranged, the curved direction may be switched depending on which hand (left or right) is used for operating the touch panel by the user, for example. In a case where the display of the screen is set to the longitudinal display and the user operates the touch panel on the display screen with, e.g., the right hand, the card-like objects may be gently curbed and arranged in succession so that the center area on the screen is protruded toward the left side of the screen and the upper and lower end areas on the screen are curved toward the right side of the screen. Alternatively, in a case where the user operates the touch panel on the display screen with, e.g., the left hand, the card-like objects may be gently curbed and arranged in succession so that the center area on the screen is protruded toward the right side of the screen and the upper and lower end areas on the screen are curved toward the left side of the screen. As a result, the user interface that can be more easily used by the user can be realized.

Further, in this embodiment, as shown in FIGS. 19 and 20, the card-like objects 101 in an initial state as in the stand-by screen are displayed so that the upper or lower portion of each card-like object originally having a rectangular shape is virtually inclined toward a screen depth to a slight extent. It should be noted that in a case where the display screen is used laterally and the card-like objects are laterally arranged in succession and displayed, it is desirable that the left or right side of each rectangular card-like object is virtually inclined toward the screen depth.

As described above, in this embodiment, by virtually inclining the originally rectangular card-like objects toward the screen depth, it becomes possible to display a larger number of card-like objects on the screen, as compared to a case where the rectangular card-like objects are arranged as they are. In the description below, the card-like objects 101 in the state of being inclined toward the screen depth are specifically represented as card-like objects 101*d* in an idle state.

On each card-like object 101 in the idle state, displayed is the information properly indicating the characteristics of the content and the details of the update, such as the information indicating which application program the content is corresponded to, the information that is unique to each content and capable of indicating each content attribute, and the information on the date and time of the update or the like, as described above.

Further, when the user inputs an instruction to select a desired card-like object 101 through a predetermined gesture operation to, for example, the touch panel on the display screen from among the card-like objects arranged and displayed on the screen as described above, the display state of the card-like object 101 selected through the instruction input is changed in the mobile body terminal of this embodiment.

Here, in this embodiment, the predetermined gesture operation for selecting the desired card-like object is a gesture operation of touching, by the user, a part of a detection area on the touch panel, which corresponds to a display area of the card-like object, for example. It should be noted that the touching gesture operation refers to a gesture operation of touching the touch panel for a certain time period or more.

Further, when one is selected from among the plurality of card-like objects 101*d* in the idle state by the touching gesture operation through the touch panel, the mobile body terminal of this embodiment displays the selected card-like object 101 as a card-like object 101*v* having a rectangular shape in the original state.

That is, in this case, the mobile body terminal of this embodiment virtually raises the card-like object 101*d* in the idle state that is inclined toward the screen depth as described above so that the surface of the selected card-like object is approximately parallel to the screen, thereby displaying the card-like object 101 as the approximately rectangular card.

As described above, in this embodiment, the card-like object 101 is virtually raised and displayed as the rectangular card-like object 101*v*, thereby informing the user of the fact that the card-like object is reliably selected. In the description below, the card-like object 101 in the state of being raised on the screen and displayed in the rectangular shape is specifically referred to as the card-like object 101*v* in a preview state. The card-like object 91 shown in FIG. 15 is the card-like object in the preview state.

On the card-like object 101*v* in the preview state, a larger number of information items are displayed as compared to the case of the card-like object 101*d* in the idle state described above. That is, the card-like object 101*v* in the preview state occupies a larger area on the screen than the card-like object 101*d* in the idle state, and thus can display the larger number of information items on the screen.

In this embodiment, in addition to the information indicating which application program the content is corresponded to, information on the date and time of the update or the like, and other information items like the card-like object 101*d* in the idle state, more detailed information items indicating the details of the update of each content are displayed on the card-like object 101*v* in the preview state.

Figure 22:
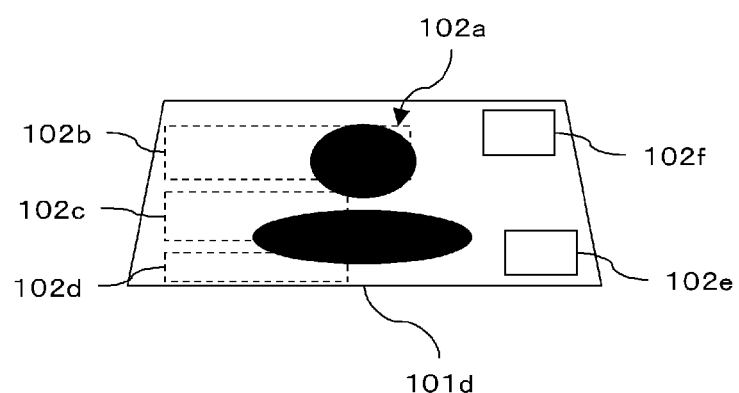
FIG. 22 A diagram for explaining the card-like object in the idle state.
Figure 23:
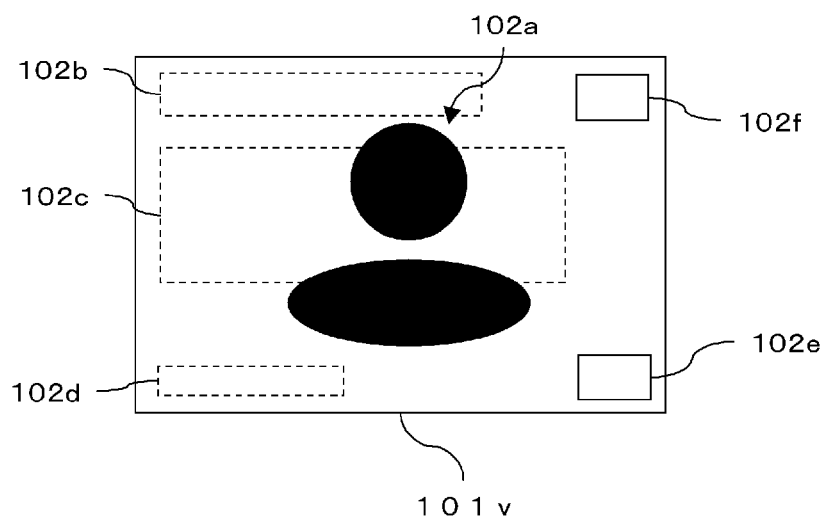
FIG. 23 A diagram for explaining the card-like object in the preview state.

FIGS. 22 and 23 are enlarged diagrams showing the card-like object 101*d* (FIG. 22) in the idle state and the card-like object 101*v* (FIG. 23) in the preview state, respectively.

On the card-like object 101*d* in the idle state shown in FIG. 22, arranged are an icon 102*e* indicating which application program the content is corresponded to, out of the various application programs for the SNS, e-mail, music, picture, and the like, character information 102*b* as information that is unique to each content and capable of indicating each attribute of the contents, such as a message transmission source or a news headline, character information 102c simply indicating the details of the update of each content, and character information 102d indicating the date and time of the update, addition, or the like. In addition, in a case where there is a thumbnail image of a picture or the like of a message transmission source, a thumbnail image of an album cover of music, or the like, a thumbnail image 102a thereof is displayed on the card-like object 101d as an information item capable of indicating the attribute of the content.

On the other hand, on the card-like object 101v shown in FIG. 23, the icon 102e and the date-and-time character information 102d are arranged as in the case of the card-like object 101d in the idle state, and the character information 102c indicating the details of the update of each content in more detail than that in the idle state is indicated.

In addition, after the card-like object 101v is brought into the preview state, if the user gives no instruction for a certain time period or more, the mobile body terminal of this embodiment causes the card-like object 101v to return to the card-like object 101d in the idle state.

Further, in the mobile body terminal of this embodiment, on the card-like object 101d in the idle state shown in FIG. 22 or on the card-like object 101v in the preview state shown in FIG. 23, an icon 102f for notification of the similar face registration described above or notification of completion of associating the object with the phone book is also displayed, in addition to the thumbnail image 102a and the like as described above. That is, in a case where the user performs a predetermined instruction operation with respect to the card-like object on which the icon 102f is indicated, the mobile body terminal of this embodiment performs the single image display or the similar face image collective display as described above, an image display associated with the phone book information, or the like.

(Process Flow in Similar Face Display Section)

Figure 24:
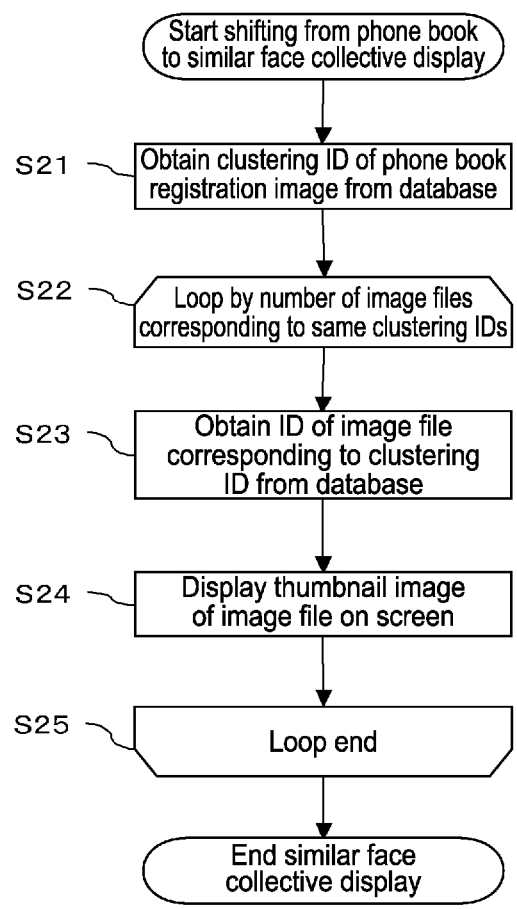
FIG. 24 A flowchart showing a process at a time when a phone book information display is shifted to a similar face image collective display in the similar face display section.

FIG. 24 is a flowchart showing processes at a time when the phone book information display shown in FIG. 17 is shifted to the similar face image collective display in the similar face display section 23 shown in FIG. 14 described above.

In FIG. 24, in the case where the phone book information display as shown in FIG. 17 is performed, when the user carries out an operation of, for example, touching the icon 102f (92) for the similar face registration notification for requesting the collective display of the similar face images, the similar face image collective display section 82 obtains a clustering ID corresponding to the face image 93 displayed with the phone book information 94 from the database of the face classification information storage 66 of the similar face classification section 22 in Step S21.

Next, the similar face image collective display section 82 performs a loop process of Steps S22 to S25. The loop process is repeatedly performed by the number of image files corresponding to the same clustering ID.

In the loop process of Step S22 to S25, first, the similar face image collective display section 82 obtains an ID of the image file corresponding to the clustering ID from the database of the image file information storage 35 of the taken image detector/register 20 in Step S23.

Next, in Step S24, the similar face image collective display section 82 obtains a thumbnail image corresponding to the ID of the image file from the image file information storage 35 and displays the obtained thumbnail image on the display screen 2.

When the loop process of Steps S22 to S25 is performed by the number of image files, the collective display of the similar face images as described above is performed. When the collective display is completed, the similar face image collective display section 82 ends the process of the flowchart of FIG. 24.

Figure 25:
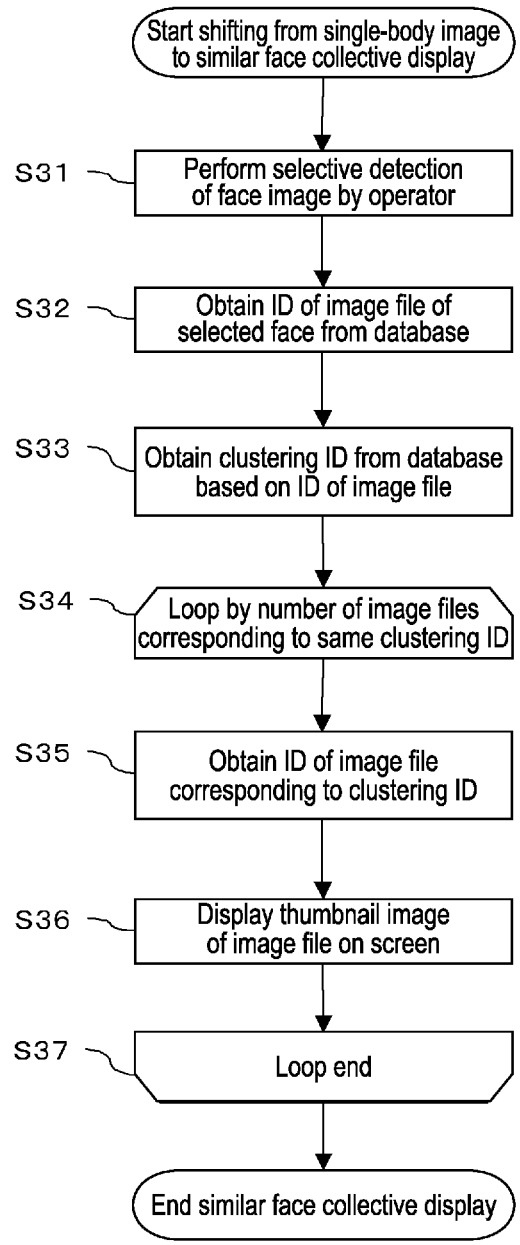
FIG. 25 A flowchart showing a process at a time when a single image display is shifted to the similar face image collective display in the similar face display section.

FIG. 25 is a flowchart showing processes at a time when the single image display as shown in FIG. 16 is shifted to the similar face image collective display in the similar face display section 23 shown in FIGS. 13 and 14 described above.

In FIG. 25, in the case where the single image display as shown in FIG. 16 is performed, when detecting that the user performs the operation of, for example, touching the similar face registration notification icon 102f (92) for requesting the collective display of the similar face images with respect to the face image in the single image, the single image display section 83 passes the process to the similar face image collective display section 82 in Step S31.

In Step S32, the similar face image collective display section 82 in this case obtains the ID of the image file corresponding to the face image that has been subjected to the single image display from the database of the image file information storage 35 of the taken image detector/register 20.

Next, in Step S33, the similar face image collective display section 82 obtains a clustering ID corresponding to the obtained image file from the database of the face classification information storage 66 of the similar face classification section 22.

Next, the similar face image collective display section 82 performs a loop process of Steps S34 to 37. The loop process is repeatedly performed by the number of image files corresponding to the same clustering ID.

In the loop process of Steps S34 to S37, first, the similar face image collective display section 82 obtains an ID of the image file corresponding to the clustering ID from the database of the image file information storage 35 of the taken image detector/register 20 in Step S35.

Next, in Step S36, the similar face image collective display section 82 obtains a thumbnail image corresponding to the ID of the image file from the image file information storage 35 and displays the obtained thumbnail image on the display screen 2.

When the loop process of Steps S34 to S37 is performed by the number of image files, the collective display of the similar face images as described above is performed. When the collective display is completed, the similar face image collective display section 82 ends the process of the flowchart of FIG. 25.

Figure 26:
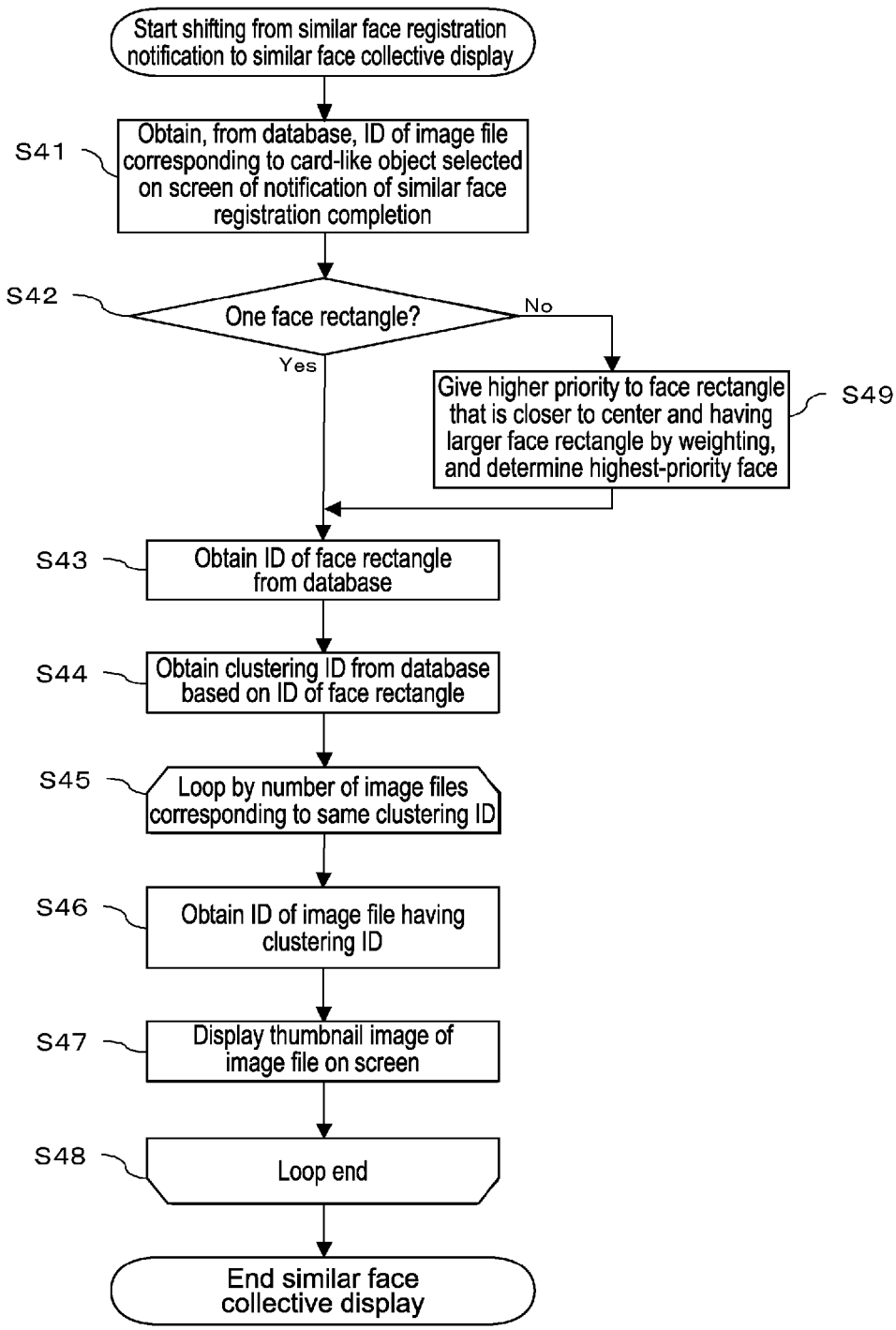
FIG. 26 A flowchart showing a process at a time when a state in which the similar face registration notification is performed is shifted to the similar face image collective display in the similar face display section.

FIG. 26 is a flowchart showing processes in a case where the user is notified of the completion of the similar face registration by displaying the similar face registration notification icon 102f (92) on a certain card-like object in a state where the plurality of card-like objects are arranged and displayed in the chronological order, and the user selects the card-like object on which the icon 102f (92) is indicated and inputs an instruction operation to perform the similar face image collective display, with the result that the collective display of the similar face images are performed.

In FIG. 26, in the state where the plurality of card-like objects described above are arranged and displayed in the chronological order, when the user is notified of the completion of the similar face registration by indicating the similar face registration notification icon 102f (92) on the certain card-like object, the user selects the card-like object 91 and performs the operation of, for example, touching the similar face registration notification icon 102f (92) for requesting the collective display, and the similar face registration notification section 81 passes the process to the similar face image collective display section 82.

In Step S41, the similar face image collective display section 82 in this case obtains an ID of a face rectangle in the image file corresponding to the card-like object 91 of the similar face registration notification from the database of the face rectangle information storage 54.

Next, the similar face image collective display section 82 judges whether the number of face rectangles in the image file is one on the basis of the face rectangle ID obtained in Step S41. When it is judged that the number of face rectangles is one, the process proceeds to Step S43, or when judged that the number of face rectangles is two or more, the process proceeds to Step S49.

When the process proceeds to Step S49, the similar face image collective display section 82 weighs face rectangles that are closer to the center and have larger areas, out of the face rectangles detected in the image file, thereby ranking the face rectangles, and selects a highest-rank (highest-priority) face rectangle. After Step S49, the process proceeds to Step S43.

In Step S43, the similar face image collective display section 82 obtains again the ID of the face rectangle from the database of the face rectangle information storage 54. Then, in Step S44, the similar face image collective display section 82 obtains a clustering ID from the database of the face classification information storage 66 of the similar face classification section 22 based on the ID of the face rectangle.

Next, the similar face image collective display section 82 performs a loop process of Steps S45 to S48. The loop process is repeatedly performed by the number of image files corresponding to the same clustering ID.

In the loop process of Step S45 to S48, first, the similar face image collective display section 82 obtains an ID of the image file corresponding to the clustering ID from the database of the image file information storage 35 of the taken image detector/register 20 in Step S46.

Next, in Step S47, the similar face image collective display section 82 obtains a thumbnail image corresponding to the ID of the image file from the image file information storage 35 and displays the obtained thumbnail image on the display screen 2.

When the loop process of Steps S45 to S48 is repeatedly performed by the number of image files, the collective display of the similar face images as described above is performed. When the collective display is completed, the similar face image collective display section 82 ends the process of the flowchart shown in FIG. 26.

With reference to FIG. 26, described is the example in which the card-like object on which the similar face registration notification icon 102*f* (92) is indicated is specified in the state where the plurality of card-like objects are arranged and displayed in the chronological order, and thus the collective display of the similar face images is performed. Alternatively, for example, in a case where the card-like object on which the similar face registration notification icon 102*f* (92) is indicated is specified and the single image is displayed, and thereafter the user inputs the operation instruction to perform the similar face image collective display, the collective display of the similar face images is performed in the same way as above.

CONCLUSION

As described above, according to the mobile body terminal of this embodiment, it is possible to perform the similar face classification on all the image files capable of being handled by the mobile body terminal in any cases where an image is taken by the image pickup device 12 as described with reference to FIG. 5, where the external memory 3 is inserted to the external storage device 14 as described with reference to FIG. 6, and where the new addition, change, deletion, or the like of the image file is performed as described with reference to FIG. 7 in the taken image detector/register 20.

Further, according to the mobile body terminal of this embodiment, the functions in the taken image detector/register 20, the face rectangle detector 21, and the similar face classification section 22 are implemented in the background, and therefore those functions are executed without requiring any particular operations to the user. After the similar face registration notification is performed, it is possible to perform the similar face image collective display, the phone book information display, or the like.

In addition, it is also possible to manually classify the face rectangles in the mobile body terminal of this embodiment. Accordingly, for example, even in a case where a classification result against the user's intention is provided as a result of the automatic classification, it is possible to correct the classification of the face rectangles. Further, when the manual classification is performed, and thereafter a classification process of the image files is additionally performed, classification accuracy is improved because the classification group on which the correction by the user is reflected is subjected to a classification calculation as a matrix.

Further, according to the mobile body terminal of this embodiment, the function of the similar face display section 23 is provided. Therefore, it becomes possible to display an image group including the face rectangles of the same group, and facilitate the display of the detailed information on a person registered in the phone book and the communication with the person in the case of being linked with the phone book information. In a case of being not linked with the phone book information, when a picture image is selected and newly registered in the phone book, all the image file groups of the face rectangles classified as the same group as the picture image can be linked with the registration information of the phone book in a case where the picture image has been subjected to the similar face classification.

That is, according to the mobile body terminal of this embodiment, by grouping and associating the image file that is added or updated with the face images of another picture image file in accordance with the similarity of the face images, it becomes possible to almost completely eliminate a checking operation by the user for classifying the image files and thus significantly reduce the burden on the user, with the result that the face images can be easily associated with other content data such as the phone book.

In this embodiment, the image file of the still image is used as the target content file as an example, but the detection, classification, and the like can be applied to a moving image file as in the above example. In addition, for example, by applying detection of the amount of feature of sound and similarity calculation to an audio file, the audio file can also be a classification target.

The other description on the above embodiment is merely an example of the present invention. Thus, the present invention is not limited to the above embodiment and can of course be variously modified according to the design or the like without departing from the technical idea of the present invention.

In the above embodiment, the cellular phone terminal is used as the mobile body terminal, but the present invention can be applied to other various information terminals according to the above embodiment.

REFERENCE SIGNS LIST 1 mobile body terminal (cellular phone terminal)
2 display screen
3 external memory
4 camera lens
A, B subject (human face)
5A, 5B subject image
10 CPU
11 display device
12 image pickup device
13 internal storage device
14 external storage device
20 taken image detector/register
21 face rectangle detector
22 similar face classification section
23 similar face display section
30 image pickup detector
31 image file information register
32 taken image storage
33 image file
34 actual taken image data
35 image file information storage
36 image file information
41 external storage device insertion detector
42 image file retrieval section
51 face rectangle matching section
52 face retrieval dictionary storage
53 face retrieval dictionary data
54 face rectangle information storage
55 face rectangle information
61 face feature detector
62 face similarity calculator
63 classification section
64 face feature information storage
65 face feature information
66 face classification information storage
67 face classification information
70 previous classification image obtainment section
71 manual classification section
81 similar face registration notification section
82 similar face image collective display section
83 single image display section
84 phone book information display section
91, 101d, 101v card-like object
92, 102f similar face registration notification icon
93 face image registered in phone book
94 information registered in phone book
95 thumbnail image
102a thumbnail image
102b, 102c, 102d character information
102e icon

The invention claimed is:

1. An information terminal, comprising:
circuitry configured to
detect an image file;
detect a face image included in an image of the detected image file;
calculate an amount of feature of the detected face image;
compare the amount of feature calculated with amounts of feature of different face images which are already calculated and classified into groups;
calculate similarity values between the detected face image and the different face images in the respective groups;
determine average similarity values of the respective groups, each one of the average similarity values representing an average value of the similarity values associated with a corresponding one of the groups;
determine minimum similarity values of the respective groups, each one of the minimum similarity values representing a minimum value of the similarity values associated with a corresponding one of the groups;
classify and manage the detected face image in a first one of the groups corresponding to an average similarity value that is the highest among the average similarity values and that is greater than a first threshold;
associate the face images in a second one of the groups with the first one of the groups when the average similarity value of the second one of the groups is greater than the first threshold and the minimum similarity value of the second one of the groups is greater than a second threshold; and
display at least one image file, which includes a face image classified as the first one of the groups, on a display screen based on a result of the classification of the detected face image.

2. The information terminal according to claim 1, wherein the circuitry is configured to detect a taken image file newly taken by an image pickup device, an unregistered image file stored in an external memory, and an image file updated by a file system that manages file information.

3. The information terminal according to claim 1, wherein the circuitry is configured to correct the result of the classification of the detected face image in accordance with an instruction given by a user, and reflect the corrected result of the classification of the detected face image in a classification of a different face image to be performed.

4. The information terminal according to claim 1, wherein the circuitry is configured to display a predetermined object image corresponding to the detected image file on the display screen, and to display a predetermined icon image for notifying the completion of the classification of the detected face image in a vicinity of the predetermined object image.

5. The information terminal according to claim 4, wherein the circuitry is configured to display, when the predetermined object image is selected and a user instruction for requesting to display the image file is input by a user, an image of the image file corresponding to the predetermined object image on the display screen.

6. The information terminal according to claim 4, wherein the circuitry is configured to display, when the predetermined object image is selected and a user instruction for requesting to display a list of a plurality of image files similar to the detected face image in the image file is input by a user, images of the plurality of image files including a face image similar to the detected face image in the image file corresponding to the predetermined object image on the display screen as a list.

7. The information terminal according to claim 4, wherein the circuitry is configured to display, when the predetermined object image is selected and a user instruction for requesting to display registration information associated with a desired face image is input by a user in a state where predetermined registration information associated with each of a plurality of face images is stored, the registration information associated with the desired face image on the display screen along with the face image.

8. The information terminal according to claim 4, wherein the circuitry is configured to display the at least one image file on the display screen based on the result of the classification of the detected face image and in response to a selection of the predetermined icon image by a user.

9. The information terminal according to claim 1, wherein the circuitry is configured to display the at least one image file on the display screen in response to a request for one or more images similar to the detected face image.

10. The information terminal according to claim 1, wherein the circuitry is configured to display a predetermined object image corresponding to the detected image file on the display screen, and to display a predetermined icon image indicating a corresponding application program.

11. An information control method for an information terminal, comprising:
   detecting an image file by circuitry of the information terminal;
   detecting a face image included in an image of the image file detected by the circuitry;
   calculating an amount of feature of the face image detected by the circuitry;
   comparing the amount of feature calculated with amounts of feature of different face images which are already calculated and classified into groups;
   calculating similarity values between the detected face image and the different face images in the respective groups;
   determining average similarity values of the respective groups, each one of the average similarity values representing an average value of the similarity values associated with a corresponding one of the groups;
   determining minimum similarity values of the respective groups, each one of the minimum similarity values representing a minimum value of the similarity values associated with a corresponding one of the groups;
   classifying and managing the detected face image in a first one of the groups corresponding to an average similarity value that is the highest among the average similarity values and that is greater than a first threshold by the circuitry;
   associating the face images in a second one of the groups with the first one of the groups when the average similarity value of the second one of the groups is greater than the first threshold and the minimum similarity value of the second one of the groups is greater than a second threshold; and
   displaying, by the circuitry, at least one image file, which includes a face image classified as the first one of the groups, on a display screen based on a result of the classification of the detected face image which is performed by the circuitry.

12. The information control method according to claim 11, further comprising:
   displaying a predetermined object image corresponding to the detected image file on the display screen, and displaying a predetermined icon image for notifying the completion of the classification of the detected face image in a vicinity of the predetermined object image.

13. The information control method according to claim 11, further comprising:
   displaying a predetermined object image corresponding to the detected image file on the display screen, and displaying a predetermined icon image indicating a corresponding application program.

14. A non-transitory computer-readable storage medium storing a program which when executed by a computer causes the computer to perform an information control method, the method comprising:
   detecting an image file;
   detecting a face image included in an image of the detected image file;
   calculating an amount of feature of the face image detected by the computer;
   comparing the amount of feature calculated with amounts of feature of different face images which are already calculated and classified into groups;
   calculating similarity values between the detected face image and the different face images in the respective groups;
   determining average similarity values of the respective groups, each one of the average similarity values representing an average value of the similarity values associated with a corresponding one of the groups;
   determining minimum similarity values of the respective groups, each one of the minimum similarity values representing a minimum value of the similarity values associated with a corresponding one of the groups;
   classifying and managing the detected face image in a first one of the groups corresponding to an average similarity value that is the highest among the average similarity values and that is greater than a first threshold;
   associating the face images in a second one of the groups with the first one of the groups when the average similarity value of the a second one of the groups is greater than the first threshold and the minimum similarity value of the a second one of the groups is greater than a second threshold; and
   displaying at least one image file, which is includes a face image classified as the first one of the groups, on a display screen based on a result of the classification of the detected face image by the computer.

15. The non-transitory computer-readable storage medium according to claim 14, wherein the method further comprises:
   displaying a predetermined object image corresponding to the detected image file on the display screen, and displaying a predetermined icon image for notifying the completion of the classification of the detected face image in a vicinity of the predetermined object image.

16. The non-transitory computer-readable storage medium according to claim 14, wherein the method further comprises:
   displaying a predetermined object image corresponding to the detected image file on the display screen, and displaying a predetermined icon image indicating a corresponding application program.

* * * * *